US012504380B2

(12) United States Patent
Ranum et al.

(10) Patent No.: US 12,504,380 B2
(45) Date of Patent: Dec. 23, 2025

(54) IMMUNOASSAYS FOR DETECTION OF RAN PROTEINS

(71) Applicant: University of Florida Research Foundation, Incorporated, Gainesville, FL (US)

(72) Inventors: Laura Ranum, Gainesville, FL (US); Lien Nguyen, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 99 days.

(21) Appl. No.: 16/650,016

(22) PCT Filed: Sep. 25, 2018

(86) PCT No.: PCT/US2018/052745
§ 371 (c)(1),
(2) Date: Mar. 24, 2020

(87) PCT Pub. No.: WO2019/060918
PCT Pub. Date: Mar. 28, 2019

(65) Prior Publication Data
US 2020/0232925 A1   Jul. 23, 2020

Related U.S. Application Data

(60) Provisional application No. 62/563,009, filed on Sep. 25, 2017.

(51) Int. Cl.
*G01N 21/76* (2006.01)
*G01N 33/68* (2006.01)

(52) U.S. Cl.
CPC ......... *G01N 21/76* (2013.01); *G01N 33/6896* (2013.01); *G01N 2458/30* (2013.01); *G01N 2800/52* (2013.01)

(58) Field of Classification Search
CPC ........... G01N 2800/52; G01N 2458/30; G01N 21/76; G01N 33/6896; C07K 14/47; C07K 16/18
See application file for complete search history.

(56) References Cited

U.S. PATENT DOCUMENTS 5,011,912 A   4/1991   Hopp et al.
6,204,008 B1  3/2001   Borneman et al.
(Continued)

FOREIGN PATENT DOCUMENTS

CA   3137666 A1   11/2020
EP   2 837 390 A1   2/2015
(Continued)

OTHER PUBLICATIONS

GENDRON1 in Poly (GP) proteins are a useful pharmacodynamic marker for C9ORF72-associated amyotrophic lateral sclerosis (Year: 2017).*
(Continued)

*Primary Examiner* — Rebecca M Fritchman
(74) *Attorney, Agent, or Firm* — Wolf, Greenfield & Sacks, P.C.

(57) ABSTRACT

Aspects of the disclosure relate to methods and compositions (e.g., kits) for detecting repeat-associated non-ATG (RAN) proteins in a subject (e.g., a subject having or suspected of having a disease associated with RAN protein translation, for example amyotrophic lateral sclerosis (ALS) and/or frontotemporal dementia (FTD), or spinocerebellar ataxia type 36 (SCA36), or other diseases that produce poly(PR), poly(GR) or poly(GP) RAN proteins. In some embodiments, methods described by the disclosure comprise detecting one or more RAN proteins in a biological sample obtained from a subject by an electrochemiluminescence-based immunoassay using one or more anti-RAN protein antibodies. In some embodiments, the disclosure relates to
(Continued)

kits comprising one or more anti-RAN antibodies and an electrochemiluminescence-based immunoassay plate and/or reagents.

5 Claims, 9 Drawing Sheets

(56) References Cited

U.S. PATENT DOCUMENTS

| | | |
|---|---|---|
| 6,326,151 B1 | 12/2001 | Katze et al. |
| 6,342,581 B1 | 1/2002 | Rosen et al. |
| 7,008,796 B2 | 3/2006 | Wohlstadter et al. |
| 7,481,997 B1 | 1/2009 | Hardy |
| 8,993,633 B2 | 3/2015 | Megeney et al. |
| 9,448,232 B2 | 9/2016 | Petrucelli et al. |
| 10,295,547 B2 | 5/2019 | Ranum et al. |
| 10,509,045 B2 | 12/2019 | Ranum et al. |
| 10,663,475 B2 | 5/2020 | Ranum et al. |
| 10,940,161 B2 | 3/2021 | Ranum et al. |
| 11,034,974 B2 | 6/2021 | Ling et al. |
| 11,345,911 B2 | 5/2022 | Ranum et al. |
| 11,903,910 B2 | 2/2024 | Ranum et al. |
| 12,025,622 B2 | 7/2024 | Ranum et al. |
| 12,360,124 B2 | 7/2025 | Ranum et al. |
| 12,364,707 B2 | 7/2025 | Ranum et al. |
| 2002/0165355 A1 | 11/2002 | Meheus et al. |
| 2003/0233675 A1 | 12/2003 | Cao et al. |
| 2005/0042657 A1 | 2/2005 | Weese-Mayer et al. |
| 2006/0068434 A1* | 3/2006 | Stoerker ............ G01N 33/574 435/6.12 |
| 2007/0004729 A1 | 1/2007 | Timmer et al. |
| 2007/0014810 A1 | 1/2007 | Baker et al. |
| 2007/0036760 A1 | 2/2007 | Wilson et al. |
| 2007/0093426 A1 | 4/2007 | Wormser |
| 2008/0188457 A1 | 8/2008 | Barlow et al. |
| 2008/0227699 A1 | 9/2008 | Chiba et al. |
| 2008/0248099 A1 | 10/2008 | Ishii |
| 2009/0074721 A1 | 3/2009 | Kim et al. |
| 2009/0143418 A1 | 6/2009 | Dixon et al. |
| 2009/0148866 A1* | 6/2009 | Datwyler ............ G01N 33/6893 435/28 |
| 2009/0312395 A1* | 12/2009 | El-Tanani ............ C12N 15/113 435/6.14 |
| 2010/0298280 A1 | 11/2010 | Kioschis-Schneider et al. |
| 2012/0076785 A1 | 3/2012 | Nikolaev et al. |
| 2012/0094299 A1 | 4/2012 | Ranum et al. |
| 2012/0220534 A1 | 8/2012 | Levin et al. |
| 2013/0085169 A1 | 4/2013 | Baghdoyan et al. |
| 2013/0115603 A9 | 5/2013 | Ranum et al. |
| 2014/0100282 A1 | 4/2014 | Wong |
| 2014/0336133 A1 | 11/2014 | Miller et al. |
| 2015/0361166 A1 | 12/2015 | Edbauer et al. |
| 2016/0025747 A1* | 1/2016 | Ranum ................ A61K 35/28 435/7.1 |
| 2016/0096800 A1 | 4/2016 | Walter et al. |
| 2016/0346297 A1 | 12/2016 | Sheehan |
| 2018/0050001 A1 | 2/2018 | During et al. |
| 2018/0088111 A1 | 3/2018 | Ni et al. |
| 2018/0292416 A1 | 10/2018 | Ranum et al. |
| 2019/0142858 A1 | 5/2019 | Ranum et al. |
| 2019/0153445 A1 | 5/2019 | Seow et al. |
| 2019/0285652 A1 | 9/2019 | Ranum et al. |
| 2020/0140846 A1 | 5/2020 | Ranum et al. |
| 2020/0206255 A9 | 7/2020 | Ranum et al. |
| 2020/0241013 A1 | 7/2020 | Ranum et al. |
| 2020/0268691 A1 | 8/2020 | Ranum et al. |
| 2020/0341012 A1 | 10/2020 | Ranum et al. |
| 2020/0355701 A1 | 11/2020 | Van Meter |
| 2021/0236535 A1 | 8/2021 | Ranum et al. |
| 2021/0285970 A1 | 9/2021 | Ranum et al. |
| 2022/0373559 A1 | 11/2022 | Ranum et al. |
| 2023/0002753 A1 | 1/2023 | Ranum et al. |
| 2023/0218730 A1 | 7/2023 | Ranum et al. |
| 2023/0288434 A1 | 9/2023 | Ranum et al. |
| 2024/0069039 A1 | 2/2024 | Ranum et al. |
| 2024/0269093 A1 | 8/2024 | Ranum et al. |
| 2024/0393348 A1 | 11/2024 | Ranum et al. |
| 2025/0041247 A1 | 2/2025 | Ranum et al. |
| 2025/0164489 A1 | 5/2025 | Ranum et al. |

FOREIGN PATENT DOCUMENTS

| | | |
|---|---|---|
| EP | 2 948 471 A1 | 12/2015 |
| JP | 2004-518437 A | 6/2004 |
| JP | 2004-520803 A | 7/2004 |
| JP | 2007-507223 A | 3/2007 |
| JP | 2012-501193 A | 1/2012 |
| JP | 2016-515208 A | 5/2016 |
| JP | 2016-180665 A | 10/2016 |
| JP | 2017-019773 A | 1/2017 |
| JP | 2017-205118 A | 11/2017 |
| JP | 2019-515894 A | 6/2019 |
| WO | WO 2001/75067 A2 | 10/2001 |
| WO | WO 2001/081581 A2 | 11/2001 |
| WO | WO 2002/040672 A2 | 5/2002 |
| WO | WO 2002/062945 A2 | 8/2002 |
| WO | WO 2005/033321 A2 | 4/2005 |
| WO | WO 2006/083800 A2 | 8/2006 |
| WO | WO 2009/144480 A1 | 12/2009 |
| WO | WO 2010/115033 A2 | 10/2010 |
| WO | WO 2010/132982 A1 | 11/2010 |
| WO | WO 2011/052906 A2 | 5/2011 |
| WO | WO 2012/159754 A2 | 11/2012 |
| WO | WO 2013/030588 A1 | 3/2013 |
| WO | WO 2013/061163 A2 | 5/2013 |
| WO | WO 2013/172537 A1 | 11/2013 |
| WO | WO 2014/114303 A1 | 7/2014 |
| WO | WO 2014/114660 A1 | 7/2014 |
| WO | WO 2014/116865 A1 | 7/2014 |
| WO | WO 2014/159247 A1 | 10/2014 |
| WO | WO 2016/025692 A1 | 2/2016 |
| WO | WO 2017/055612 A1 | 4/2017 |
| WO | WO 2018/035408 A1 | 2/2018 |
| WO | WO 2018/195110 A1 | 10/2018 |
| WO | WO 2019/060918 A1 | 3/2019 |
| WO | WO 2019/067587 A1 | 4/2019 |
| WO | WO 2021/007110 A1 | 1/2021 |
| WO | WO 2021/055880 A1 | 3/2021 |
| WO | WO 2021/231887 A1 | 11/2021 |

OTHER PUBLICATIONS

GENDRON2 in Cerebellar c9RAN proteins associate with clinical and neuropathological characteristics of C9ORF72 repeat expansion carriers (Year: 2015).*
Extended European Search Report for Application No. EP 14776090.4 mailed Sep. 30, 2016.
International Search Report and Written Opinion for Application No. PCT/US2014/022670 mailed on Aug. 22, 2014.
International Preliminary Report on Patentability for Application No. PCT/US2014/022670 mailed on Sep. 24, 2015.
International Search Report and Written Opinion for Application No. PCT/US2016/034738 mailed on Sep. 21, 2016.
International Preliminary Report on Patentability for Application No. PCT/US2016/034738 mailed on Dec. 14, 2017.
International Search Report and Written Opinion for Application No. PCT/US2017/026020 mailed July 7. 2017.
International Preliminary Report on Patentability for Application No. PCT/US2017/026020 mailed Oct. 18, 2018.
International Search Report and Written Opinion for Application No. PCT/US2018/028015 mailed Jul. 27, 2018.
International Preliminary Report on Patentability for Application No. PCT/US2018/028015 mailed Oct. 31, 2019.
International Search Report and Written Opinion for Application No. PCT/US2018/052745 mailed Dec. 6, 2018.
International Preliminary Report on Patentability for Application No. PCT/US2018/052745 mailed Apr. 9, 2020.
Supplementary Partial European Search Report for Application No. EP 17779695.0 mailed Oct. 18, 2019.

(56) References Cited

OTHER PUBLICATIONS

[No Author Listed] EBNA1—Epstein-Barr nuclear antigen 1—Epstein-Barr virus (strain GD1) (HHV-4)—EBNA1 gene & protein, Jan. 2018. 2018. Retrieved from the internet under https://www.uniprot.org/uniprot/Q3KSS4 on Sep. 12, 2018. 6 pages.
Ash et al., Unconventional translation of C9ORF72 GGGGCC expansion generates insoluble polypeptides specific to c9FTD/ALS. Neuron. Feb. 20, 2013;77(4):639-46. doi: 10.1016/j.neuron.2013.02.004. Epub Feb. 12, 2013.
Ashizawa et al., GGCCTG repeats put a hex on Purkinje cells and motor neurons in SCA36. Neurology. Jul. 24, 2012;79(4):302-3. doi: 10.1212/WNL.0b013e31826043d9. Epub Jun. 27, 2012.
Ayhan et al., SCA8 RAN polySer protein preferentially accumulates in white matter regions and is regulated by eIF3F. EMBO J. Oct. 1, 2018;37(19). pii: e99023. doi: 10.15252/embj.201899023. Epub Sep. 11, 2018.
Baboonian et al., Cross reaction of antibodies to a glycine/alanine repeat sequence of Epstein-Barr virus nuclear antigen-1 with collagen, cytokeratin, and actin. Ann Rheum Dis. Nov. 1991;50(11):772-5.
Bae et al., Antibody-aided clearance of extracellular α-synuclein prevents cell-to-cell aggregate transmission. J Neurosci. Sep. 26, 2012;32(39):13454-69.
Bañez-Coronel et al., A pathogenic mechanism in Huntington's disease involves small CAG-repeated RNAs with neurotoxic activity. PLoS Genet. 2012;8(2):e1002481. doi: 10.1371/journal.pgen.1002481. Epub Feb. 23, 2012.
Bañez-Coronel et al., RAN Translation in Huntington Disease. Neuron. Nov. 18, 2015;88(4):667-77. doi: 10.1016/j.neuron.2015.10.038. Author manuscript.
Carroll et al., Potent and selective antisense oligonucleotides targeting single-nucleotide polymorphisms in the Huntington disease gene / allele-specific silencing of mutant huntingtin. Mol Ther. Dec. 2011;19(12):2178-85. doi: 10.1038/mt.2011.201. Epub Oct. 4, 2011.
Chen et al., Functional genomics in *Drosophila* models of human disease. Briefings in Functional Genomics. Aug. 22, 2012;11(5):405-415.
Cleary et al., Repeat-associated non-ATG (RAN) translation in neurological disease. Hum Mol Genet. Oct. 15, 2013;22(R1):R45-51. doi: 10.1093/hmg/ddt371. Epub Aug. 4, 2013.
Donnelly et al., RNA toxicity from the ALS/FTD C9ORF72 expansion is mitigated by antisense intervention. Neuron. Oct. 16, 2013;80(2):415-28. doi: 10.1016/j.neuron.2013.10.015.
Duan et al., Generation of polyclonal antiserum for the detection of methylarginine proteins. J Immunol Methods. Mar. 30, 2007;320(1-2):132-42. Epub Feb. 6, 2007.
Duellman et al., Antigen-binding properties of monoclonal antibodies reactive with EBNA1 and use in immunoaffinity chromatography. PLoS One. 2009;4(2):e4614. doi: 10.1371/journal.pone.0004614. Epub Feb. 26, 2009.
Gkogkas et al., Pharmacogenetic inhibition of eIF4E-dependent Mmp9 mRNA translation reverses fragile X syndrome-like phenotypes. Cell Rep. Dec. 11, 2014;9(5):1742-1755. doi: 10.1016/j.celrep.2014.10.064. Epub Nov. 26, 2014.
Gómez-Tortosa et al., C9ORF72 hexanucleotide expansions of 20-22 repeats are associated with frontotemporal deterioration. Neurology. Jan. 22, 2013;80(4):366-70. doi: 10.1212/WNL.0b013e31827f08ea. Epub Jan. 2, 2013.
Hock et al., Antibodies against beta-amyloid slow cognitive decline in Alzheimer's disease. Neuron. May 22, 2003;38(4):547-54.
Kearse et al., CGG Repeat-Associated Non-AUG Translation Utilizes a Cap-Dependent Scanning Mechanism of Initiation to Produce Toxic Proteins. Mol Cell. Apr. 21, 2016;62(2):314-322. doi: 10.1016/j.molcel.2016.02.034. Epub Mar. 31, 2016.
Mori et al., The C9orf72 GGGGCC repeat is translated into aggregating dipeptide-repeat proteins in FTLD/ALS. Science. Mar. 15, 2013;339(6125):1335-8. doi: 10.1126/science.1232927. Epub Feb. 7, 2013. Supplementary information included.
Satoh et al., Dystrophic neurites express C9orf72 in Alzheimer's disease brains. Alzheimers Res Ther. Aug. 16, 2012;4(4):33. doi: 10.1186/alzrt136. 13 pages.
Sha et al., Treatment implications of C9ORF72. Alzheimer's Res Ther. Nov. 27, 2012;4(6):46. doi: 10.1186/alzrt149. eCollection 2012.
Shoesmith et al., Amyotrophic lateral sclerosis: update for family physicians. Can Fam Physician. Dec. 2006;52(12):1563-9.
Trouth et al., Myasthenia gravis: a review. Autoimmune Dis. ;2012:874680. doi: 10.1155/2012/874680. Epub Oct. 31, 2012.
Welnowska et al., Translation of viral mRNA without active eIF2: the case of picornaviruses. PLoS One. 2011;6(7):e22230. doi: 10.1371/journal.pone.0022230. Epub Jul. 14, 2011.
Wojciechowska et al., RAN translation and frameshifting as translational challenges at simple repeats of human neurodegenerative disorders. Nucleic Acids Res. Oct. 29, 2014;42(19):11849-64. doi: 10.1093/nar/gku794. Epub Sep. 12, 2014.
Xiao et al., Isoform-specific antibodies reveal distinct subcellular localizations of C9orf72 in amyotrophic lateral sclerosis. Ann Neurol. Oct. 2015;78(4):568-83. doi: 10.1002/ana.24469. Epub Aug. 29, 2015.
Yanagisawa et al., Protein Binding of a DRPLA Family Through Arginine-Glutamic Acid Dipeptide repeats is Enhanced by Extended polyglutamine. Human Molecular Genetics. 2000;9(9):1433-1442.
Yu et al., Developing therapeutic antibodies for neurodegenerative disease. Neurotherapeutics. Jul. 2013;10(3):459-72. doi: 10.1007/s13311-013-0187-4.
Zhang et al., Aggregation-prone c9FTD/ALS poly(GA) RAN-translated proteins cause neurotoxicity by inducing ER stress. Acta Neuropathol. 2014;128:505-24.
Zu et al., RAN proteins and RNA foci from antisense transcripts in C9ORF72 ALS and frontotemporal dementia. Proc Natl Acad Sci U S A. Dec. 17, 2013;110(51):E4968-77. doi: 10.1073/pnas.1315438110. Epub Nov. 18, 2013.
U.S. Appl. No. 16/851,690, filed Apr. 17, 2020, Ranum et al.
U.S. Appl. No. 16/695,717, filed Nov. 26, 2019, Ranum et al.
U.S. Appl. No. 16/091,444, filed Oct. 4, 2018, Ranum et al.
U.S. Appl. No. 16/605,992, filed Oct. 17, 2019, Ranum et al.
14776090.4, Sep. 30, 2016, Extended European Search Report.
PCT/US2014/022670, Aug. 22, 2014, International Search Report and Written Opinion.
PCT/US2014/022670, Sep. 24, 2015, International Preliminary Report on Patentability.
PCT/US2016/034738, Sep. 21, 2016, International Search Report and Written Opinion.
PCT/US2016/034738, Dec. 14, 2017, International Preliminary Report on Patentability.
17779695.0, Oct. 18, 2019, Supplementary Partial European Search Report.
PCT/US2017/026020, Jul. 7, 2017, International Search Report and Written Opinion.
PCT/US2017/062020, Oct. 18, 2018, International Preliminary Report on Patentability.
PCT/US2018/028015, Jul. 27, 2018, International Search Report and Written Opinion.
PCT/US2018/028015, Oct. 31, 2019, International Preliminary Report on Patentability.
PCT/US2018/052745, Dec. 6, 2018, International Search Report and Written Opinion.
PCT/US2018/052745, Apr. 9, 2020, International Preliminary Report on Patentability.
Extended European Search Report, mailed Jan. 7, 2020, in connection with Application No. EP 17779695.0.
Extended European Search Report, mailed Dec. 17, 2020, in connection with Application No. EP 18786964.9.
Extended European Search Report, mailed Nov. 26, 2021, in connection with Application No. EP 18860923.4.
International Search Report and Written Opinion, mailed Jan. 15, 2019, in connection with Application No. PCT/US2018/052913.
International Preliminary Report on Patentability, mailed Apr. 9, 2020, in connection with Application No. PCT/US2018/052913.
Extended European Search Report, mailed Jun. 11, 2021, in connection with Application No. EP 18859783.5.

(56) References Cited

OTHER PUBLICATIONS

[No Author Listed] Amersham ECL Western Blotting Detection Reagent. Retrieved from the internet under https://www.cytivalifesciences.com/en/us/shop/protein-analysis/blotting-and-detection/blotting-standards-and-reagents/amersham-ecl-western-blotting-detection-reagent-p-05748 on Feb. 22, 2022, 6 pages.

[No Author Listed], Abstracts. Medizinische Genetik, Berufsverband Medizinische Genetik, Muchen, DE. Medgen. Mar. 4, 2016; 28(1):84-232. DOI: 10.1007/s11825-016-0083-5.

Jin et al., Metformin Protects Cells from Mutant Huntingtin Toxicity Through Activation of AMPK and Modulation of Mitochondrial Dynamics. Neuromolecular Med. Dec. 2016;18(4):581-592. doi: 10.1007/s12017-016-8412-z. Epub May 25, 2016. Author Manuscript, 19 pages.

Ma et al., Metformin therapy in a transgenic mouse model of Huntington's disease. Neurosci Lett. Jan. 10, 2007;411(2):98-103. doi: 10.1016/j.neulet.2006.10.039. Epub Nov. 15, 2006.

Wang et al., Comparative Analysis of VOCs in Exhaled Breath of Amyotrophic Lateral Sclerosis and Cervical Spondylotic Myelopathy Patients. Sci Rep. 2016;6:26120. Published May 23, 2016. doi:10.1038/srep26120.

U.S. Appl. No. 17/826,224, filed May 27, 2022, Ranum et al.
U.S. Appl. No. 17/762,543, filed Mar. 22, 2022, Ranum et al.
U.S. Appl. No. 17/767,549, filed Apr. 8, 2022, Ranum et al.
PCT/US2020/051670, Dec. 31, 2020, International Search Report and Written Opinion.
PCT/US2020/051670, Apr. 7, 2022, International Preliminary Report on Patentability.
PCT/US2020/054976, Feb. 19, 2021, Invitation to Pay Additional Fees.
PCT/US2020/054976, Apr. 23, 2021, International Search Report and Written Opinion.
PCT/US2020/054976, Apr. 21, 2022, International Preliminary Report on Patentability.
International Search Report and Written Opinion, mailed Dec. 31, 2020, in connection with Application No. PCT/US2020/051670.
International Preliminary Report on Patentability, mailed Apr. 7, 2022, in connection with Application No. PCT/US2020/051670.
Invitation to Pay Additional Fees, mailed Feb. 9, 2021, in connection with Application No. PCT/US2020/054976.
International Search Report and Written Opinion, mailed Apr. 23, 2021, in connection with Application No. PCT/US2020/054976.
International Preliminary Report on Patentability, mailed Apr. 21, 2022, in connection with Application No. PCT/US2020/054976.
Batra et al., Partners in crime: bidirectional transcription in unstable microsatellite disease. Hum Mol Genet. Apr. 15, 2010;19(R1):R77-82. doi: 10.1093/hmg/ddq132. Epub Apr. 4, 2010.
Leitman et al., ER stress-induced eIF2-alpha phosphorylation underlies sensitivity of striatal neurons to pathogenic huntingtin. PLoS One. Mar. 3, 2014;9(3):e90803. doi: 10.1371/journal.pone.0090803.
Mirkin, Expandable DNA repeats and human disease. Nature. Jun. 21, 2007;447(7147):932-40. doi: 10.1038/nature05977.
Vaughn et al., Inhibition of PKR protects against tunicamycin-induced apoptosis in neuroblastoma cells. Gene. Feb. 15, 2014;536(1):90-6. doi: 10.1016/j.gene.2013.11.074. Epub Dec. 14, 2013.
Zhou et al., Antibodies inhibit transmission and aggregation of C9orf72 poly-GA dipeptide repeat proteins. EMBO Mol Med. May 2017;9(5):687-702. doi: 10.15252/emmm.201607054.
Invitation to Pay Additional Fees, mailed Nov. 30, 2020, in connection with Application No. PCT/US2020/051671.
International Search Report and Written Opinion, mailed Feb. 9, 2021, in connection with Application No. PCT/US2020/051671.
International Preliminary Report on Patentability, mailed Mar. 31, 2022, in connection with Application No. PCT/US2020/051671.
Cleary et al., Repeat associated non-ATG (RAN) translation: new starts in microsatellite expansion disorders. Curr Opin Genet Dev. Jun. 2014;26:6-15. doi: 10.1016/j.gde.2014.03.002. Epub May 22, 2014. Author Manuscript, 20 pages.

Extended European Search Report, mailed Aug. 25, 2023, in connection with Application No. EP 20869039.6.
Invitation to Pay Additional Fees, mailed Mar. 30, 2023, in connection with Application No. PCT/US2022/051530.
International Search Report and Written Opinion, mailed May 25, 2023, in connection with Application No. PCT/US2022/051530.
Bañez-Coronel et al., Repeat-associated non-AUG (RAN) translation: insights from pathology. Lab Invest. Jul. 2019;99(7):929-942. doi: 10.1038/s41374-019-0241-x. Epub Mar. 27, 2019.
Bañez-Coronel et al., Sense and antisense RAN proteins in the CAG•CTG polyglutamine spinocerebellar ataxias. International Congress for Ataxia Research. Abstract ID 271. Nov. 1-4, 2022. 1 page.
Barzilai et al., Metformin as a Tool to Target Aging. Cell Metab. Jun. 14, 2016;23(6):1060-1065. doi: 10.1016/j.cmet.2016.05.011.
Benkirane et al., Oncogenic potential of TAR RNA binding protein TRBP and its regulatory interaction with RNA-dependent protein kinase PKR. EMBO J. Feb. 3, 1997;16(3):611-24. doi: 10.1093/emboj/16.3.611.
Brooks et al., Spinal and bulbar muscular atrophy: a trinucleotide-repeat expansion neurodegenerative disease. Trends Neurosci. Oct. 1995;18(10):459-61. doi: 10.1016/0166-2236(95)94497-s.
Chen et al., Antidiabetic drug metformin (GlucophageR) increases biogenesis of Alzheimer's amyloid peptides via up-regulating BACE1 transcription. Proc Natl Acad Sci U S A. Mar. 10, 2009;106(10):3907-12. doi: 10.1073/pnas.0807991106. Epub Feb. 23, 2009.
Cheng et al., C9ORF72 GGGGCC repeat-associated non-AUG translation is upregulated by stress through eIF2α phosphorylation. Nat Commun. Jan. 4, 2018;9(1):51. doi: 10.1038/s41467-017-02495-z.
Cleary et al., New developments in RAN translation: insights from multiple diseases. Curr Opin Genet Dev. Jun. 2017;44:125-134. doi: 10.1016/j.gde.2017.03.006. Epub Mar. 30, 2017. Author Manuscript, 18 pages.
Foretz et al., Metformin: from mechanisms of action to therapies. Cell Metab. Dec. 2, 2014;20(6):953-66. doi: 10.1016/j.cmet.2014.09.018. Epub Oct. 30, 2014.
Gantois et al., Metformin ameliorates core deficits in a mouse model of fragile X syndrome. Nat Med. Jun. 2017;23(6):674-677. doi: 10.1038/nm.4335. Epub May 15, 2017.
Gray et al., Comparability of serum prostate-specific antigen measurement between the Roche Diagnostics Elecsys 2010 and the Abbott Architect i2000. Ann Clin Biochem. May 2004;41(Pt 3):207-12. doi: 10.1258/000456304323019578.
Green et al., RAN translation at C9orf72-associated repeat expansions is selectively enhanced by the integrated stress response. Nat Commun. Dec. 8, 2017;8(1):2005. doi: 10.1038/s41467-017-02200-0.
Jawaid et al., ALS disease onset may occur later in patients with pre-morbid diabetes mellitus. Eur J Neurol. May 2010;17(5):733-9. doi: 10.1111/j.1468-1331.2009.02923.x. Epub Jan. 13, 2010.
Kioumourtzoglou et al., Diabetes Mellitus, Obesity, and Diagnosis of Amyotrophic Lateral Sclerosis: A Population-Based Study. JAMA Neurol. Aug. 2015;72(8):905-11. doi: 10.1001/jamaneurol.2015.0910. Author Manuscript, 15 pages.
Koide et al., Unstable expansion of CAG repeat in hereditary dentatorubral-pallidoluysian atrophy (DRPLA). Nat Genet. Jan. 1994;6(1):9-13. doi: 10.1038/ng0194-9.
Koob et al., An untranslated CTG expansion causes a novel form of spinocerebellar ataxia (SCA8). Nat Genet. Apr. 1999;21(4):379-84. doi: 10.1038/7710.
Liu et al., C9orf72 BAC Mouse Model with Motor Deficits and Neurodegenerative Features of ALS/FTD. Neuron. May 4, 2016;90(3):521-34. doi: 10.1016/j.neuron.2016.04.005. Epub Apr. 21, 2016.
Memmott et al., Metformin prevents tobacco carcinogen—induced lung tumorigenesis. Cancer Prev Res (Phila). Sep. 2010;3(9):1066-76. doi: 10.1158/1940-6207.CAPR-10-0055. Epub Sep. 1, 2010.
Moon et al., Neuronal Regulation of eIF2α Function in Health and Neurological Disorders. Trends Mol Med. Jun. 2018;24(6):575-589. doi: 10.1016/j.molmed.2018.04.001. Epub Apr. 30, 2018.
Nguyen et al., Repeat-Associated Non-ATG Translation: Molecular Mechanisms and Contribution to Neurological Disease. Annu Rev

(56) References Cited

OTHER PUBLICATIONS

Neurosci. Jul. 8, 2019;42:227-247. doi: 10.1146/annurev-neuro-070918-050405. Epub Mar. 25, 2019. Author Manuscript, 24 pages.
Pakos-Zebrucka et al., The integrated stress response. EMBO Rep. Oct. 2016;17(10):1374-1395. doi: 10.15252/embr.201642195. Epub Sep. 14, 2016.
Park et al., TAR RNA-binding protein is an inhibitor of the interferon-induced protein kinase PKR. Proc Natl Acad Sci U S A. May 24, 1994;91(11):4713-7. doi: 10.1073/pnas.91.11.4713.
Perez et al., CCG•CGG interruptions in high-penetrance SCA8 families increase RAN translation and protein toxicity. EMBO Mol Med. Nov. 8, 2021;13(11):e14095. doi: 10.15252/emmm.202114095. Epub Oct. 11, 2021.
Sonenberg et al., Regulation of translation initiation in eukaryotes: mechanisms and biological targets. Cell. Feb. 20, 2009;136(4):731-45. doi: 10.1016/j.cell.2009.01.042.
Soragni et al., Repeat-Associated Non-ATG (RAN) Translation in Fuchs' Endothelial Corneal Dystrophy. Invest Ophthalmol Vis Sci. Apr. 1, 2018;59(5):1888-1896. doi: 10.1167/iovs.17-23265.
Taylor et al., Decoding ALS: from genes to mechanism. Nature. Nov. 10, 2016;539(7628):197-206. doi: 10.1038/nature20413. Author Manuscript, 28 pages.
Tian et al., Expanded CUG repeat RNAs form hairpins that activate the double-stranded RNA-dependent protein kinase PKR. RNA. Jan. 2000;6(1):79-87. doi: 10.1017/s1355838200991544.
Todd et al., CGG repeat-associated translation mediates neurodegeneration in fragile X tremor ataxia syndrome. Neuron. May 8, 2013;78(3):440-55. doi: 10.1016/j.neuron.2013.03.026. Epub Apr. 18, 2013. Erratum in: Neuron. Jul. 24, 2013;79(2):402.
Todd et al., Insights into the pathogenic mechanisms of Chromosome 9 open reading frame 72 (C9orf72) repeat expansions. J Neurochem. Aug. 2016;138 Suppl 1:145-62. doi: 10.1111/jnc.13623. Epub Jun. 15, 2016.
Tsuji, S., Dentatorubral-pallidoluysian atrophy. Handb Clin Neurol. 2012;103:587-94. doi: 10.1016/B978-0-444-51892-7.00041-3.
Vishwakarma et al., Current molecular insight to reveal the dynamics of CAG repeating units in spinocerebellar ataxia. Intractable Rare Dis Res. May 2018;7(2):79-86. doi: 10.5582/irdr.2018.01039.
Wieben et al., Amplification-free long-read sequencing of TCF4 expanded trinucleotide repeats in Fuchs Endothelial Corneal Dystrophy. PLoS One. Jul. 5, 2019;14(7):e0219446. doi: 10.1371/journal.pone.0219446.
Zhu et al., Suppression of PKR promotes network excitability and enhanced cognition by interferon-γ-mediated disinhibition. Cell. Dec. 9, 2011;147(6):1384-96. doi: 10.1016/j.cell.2011.11.029.
Zu et al., Metformin inhibits RAN translation through PKR pathway and mitigates disease in C9orf72 ALS/FTD mice. Proc Natl Acad Sci U S A. Aug. 4, 2020;117(31):18591-18599. doi: 10.1073/pnas.2005748117. Epub Jul. 20, 2020. Supplementary Materials, 33 pages.
Zu et al., Non-ATG-initiated translation directed by microsatellite expansions. Proc Natl Acad Sci U S A. Jan. 4, 2011;108(1):260-5. doi: 10.1073/pnas.1013343108. Epub Dec. 20, 2010.
Zu et al., RAN Translation Regulated by Muscleblind Proteins in Myotonic Dystrophy Type 2. Neuron. Sep. 13, 2017;95(6):1292-1305.e5. doi: 10.1016/j.neuron.2017.08.039.
Extended European Search Report, mailed Oct. 4, 2023, in connection with application No. EP 20865149.7.
Extended European Search Report, mailed Oct. 4, 2023, in connection with application No. EP 20874343.5.
International Preliminary Report on Patentability, mailed Jun. 13, 2024, in connection with Application No. PCT/US2022/051530.
International Search Report and Written Opinion, mailed Jul. 19, 2023, in connection with Application No. PCT/US2023/063328.
[No Author Listed] CRC group Top> L. K. Housing> Query, after sampling and sampling, was conducted, kept still in whole blood ; CRC Corporation, Jun. 30, 2013. https://web.archive.org/web/20130630024235/http://www.crc-group.co.jp/crc/q_and_a/149.html.
Bando et al., Double-strand RNA dependent protein kinase (PKR) is involved in the extrastriatal degeneration in Parkinson's disease and Huntington's disease. Neurochem Int. Jan. 2005;46(1):11-8. doi: 10.1016/j.neuint.2004.07.005.
Castelli et al., Mechanisms of repeat-associated non-AUG translation in neurological microsatellite expansion disorders. Biochem Soc Trans. Apr. 30, 2021;49(2):775-792. doi: 10.1042/BST20200690.
Davidkin et al., Persistence of anti-mumps virus antibodies after a two-dose MMR vaccination. A nine-year follow-up. Vaccine. Nov. 1995;13(16):1617-22. doi: 10.1016/0264-410x(95)00064-8.
Guerra et al., Human gene profiling in response to the active protein kinase, interferon-induced serine/threonine protein kinase (PKR), in infected cells. Involvement of the transcription factor ATF-3 IN PKR-induced apoptosis. J Biol Chem. Jul. 7, 2006;281(27):18734-45. doi: 10.1074/jbc.M511983200. Epub Apr. 13, 2006.
Peel et al., Double-stranded RNA-dependent protein kinase, PKR, binds preferentially to Huntington's disease (HD) transcripts and is activated in HD tissue. Hum Mol Genet. Jul. 15, 2001;10(15):1531-8. doi: 10.1093/hmg/10.15.1531.
William et al., Old friends on new paths: metformin as an early phase treatment in Huntington's Disease?, Medizinische Genetik, 28, pp. 215-216, Mar. 4, 2016 (Mar. 4, 2016) (Abstract).
International Preliminary Report on Patentability mailed Sep. 12, 2024, in connection with Application No. PCT/US2023/063328.
Asokan et al., The AAV vector toolkit: poised at the clinical crossroads. Mol Ther. Apr. 2012;20(4):699-708. doi: 10.1038/mt.2011.287. Epub Jan. 24, 2012.
Cendelin et al., Consensus Paper: Strengths and Weaknesses of Animal Models of Spinocerebellar Ataxias and Their Clinical Implications. Cerebellum. Jun. 2022;21(3):452-481. doi: 10.1007/s12311-021-01311-1. Epub Aug. 10, 2021.
Cui et al., Spinocerebellar ataxias: from pathogenesis to recent therapeutic advances. Front Neurosci. Jun. 4, 2024;18:1422442. doi: 10.3389/fnins.2024.1422442.
Tandon et al., Polyglutamine disorders: Pathogenesis and potential drug interventions. Life Sci. May 1, 2024;344:122562. doi: 10.1016/j.lfs.2024.122562. Epub Mar. 14, 2024.

\* cited by examiner

IMMUNOASSAYS FOR DETECTION OF RAN PROTEINS

RELATED APPLICATIONS

This application is a national stage filing under 35 U.S.C. § 371 of international PCT application, PCT/US2018/052745, filed Sep. 25, 2018, which claims priority under 35 U.S.C. § 119(e) to U.S. provisional patent application, U.S. Ser. No. 62/563,009, filed Sep. 25, 2017, the entire contents of each of which are incorporated herein by reference.

BACKGROUND

Expansion of a GGGGCC hexanucleotide sequence within the intron of the human C9ORF72 gene is associated with both amyotrophic lateral sclerosis and frontotemporal dementia in humans. Amyotrophic lateral sclerosis (ALS) is a debilitating disease with varied etiology characterized by rapidly progressing weakness, muscle atrophy, muscle spasticity, difficulty speaking (dysarthria), difficulty swallowing (dysphagia), and difficulty breathing (dyspnea). Although the order and rate of symptoms varies from person to person, eventually most subjects are not able to walk, get out of bed on their own, or use their hands and arms. Most subjects with ALS will eventually die from respiratory failure, usually within three to five years from the onset of symptoms. Currently available treatments for ALS are limited. Frontotemporal dementia (FTD) is also a devastating group of disorders resulting from atrophy or shrinkage of the frontal and temporal lobes of the brain. This shrinkage or atrophy results in severe behavioral changes. There is currently no cure for FTD and limited medications for managing the symptoms of FTD. New methods for diagnosing and treating ALS and/or FTD would greatly benefit ALS and FTD subjects.

SUMMARY

Aspects of the disclosure relate to methods and kits for detecting certain biomarkers associated with genomic nucleotide expansions (e.g., associated with one or more disease symptoms, for example associated with a neurological disease or condition). In some embodiments, an immunoassay (e.g., an electrochemiluminescence-based immunoassay) is used to detect or measure levels of one or more repeat associated non-ATG translation proteins in a blood sample obtained from a subject. In some embodiments, methods and kits are provided for detecting certain biomarkers (e.g., pharmacodynamic biomarkers, pharmacokinetic biomarkers, etc.) associated with amyotrophic lateral sclerosis (ALS) and/or frontotemporal dementia (FTD), or spinocerebellar ataxia type 36 (SCA36) and methods of treating such diseases based on the same. The disclosure is based, in part, on immunoassays that are capable of sensitively measuring levels of one or more repeat associated non-ATG translation proteins (also referred to as RAN proteins) from cells or tissues of subjects, e.g., subjects having or suspected of having ALS/FTD, or subjects having or suspected of having SCA36. In some aspects, methods described by the disclosure are useful for monitoring (e.g., longitudinally measuring) levels of one or more RAN protein in a subject who has been or is being administered one or more therapeutic agents for treatment of a disease or disorder associated with RAN protein expression, such as ALS, FTD, or SCA36.

In some aspects, the disclosure provides a method comprising detecting in a biological sample (e.g., a blood sample) obtained from a subject one or more RAN proteins using an electrochemiluminescence-based immunoassay. In some embodiments, an electrochemiluminescence-based immunoassay is a Meso Scale Detection (MSD) assay.

In some embodiments, a biological sample is a blood sample or a tissue sample. In some embodiments, a tissue sample is a CNS tissue sample. In some embodiments, a subject is a mammalian subject. In some embodiments, a subject is a human or a mouse. In some embodiments, a subject is a C9-BAC mouse.

In some embodiments, a subject is characterized by: a GGGGCC ($G_4C_2$) hexanucleotide sequence repeat expansion in the C9ORF72 gene; or a TGGGCC hexanucleotide sequence repeat expansion in the SCA36 gene; or other neurologic diseases that express poly(GP), poly(GR), or poly(PR) proteins. In some embodiments, a hexanucleotide sequence repeat expansion comprises at least 20, at least 30, at least 40, at least 50, at least 60, at least 70, at least 80, at least 90, at least 100, at least 200, at least 500, at least 1000, or at least 5000 $G_4C_2$ repeat expansions, or at least 20, at least 30, at least 40, at least 50, at least 60, at least 70, at least 80, at least 90, at least 100, at least 200, at least 500, at least 1000, or at least 5000 TGGGCC repeat expansions. In some embodiments, a nucleic acid sequence comprising in a repeat expansion that encodes a RAN protein (e.g., a homopolymeric RAN protein, a di-amino acid repeat-containing RAN protein, etc.) of at least 20, at least 30, at least 40, at least 50, at least 60, at least 70, at least 80, at least 90, at least 100, at least 200, at least 500, at least 1000, or at least 5000 polymer units.

In some embodiments, one or more RAN proteins detected in a sample (e.g., a biological sample) is selected from poly(GP), poly(GR), poly(PR), and poly(PA). In some embodiments, two, three or four RAN proteins are detected in a sample.

In some embodiments, an electrochemiluminescence-based immunoassay comprises a step of contacting the sample with one or more anti-RAN protein antibodies. In some embodiments, one or more anti-RAN antibodies is selected from an anti-poly(GP) antibody, anti-poly(GR) antibody, anti-poly(PR) antibody, and anti-poly(PA) antibody.

In some embodiments, an anti-RAN antibody binds to the di-amino acid repeat region of a RAN protein, for example a is poly(GP), poly(GR), poly(PR), or poly(PA) di-amino acid repeat region.

In some embodiments, an anti-RAN antibody binds to a C-terminal portion of a RAN protein, for example the C-terminal region of a RAN protein comprising a poly(GP), poly(GR), poly(PR), or poly(PA) di-amino acid repeat region.

In some embodiments, one or more anti-RAN protein antibodies is a polyclonal antibody. In some embodiments, one or more anti-RAN protein antibodies is a monoclonal antibody.

In some embodiments, methods of the disclosure further comprise administering a therapeutic agent to the subject if the level of RAN proteins detected in the biological sample is elevated compared to a level of RAN proteins detected in a control sample (e.g., a biological sample obtained from a subject that does not have a repeat expansion in their C9ORF72 gene).

In some embodiments, methods of the disclosure further comprise obtaining a second biological sample from the subject after administration of a therapeutic agent and detecting one or more RAN proteins in the sample using an electrochemiluminescence-based immunoassay.

In some aspects, the disclosure provides a method for measuring pharmacokinetic changes in RAN protein expression, the method comprising: detecting in a first biological sample (e.g., blood sample) obtained from a subject one or more RAN proteins using an electrochemiluminescence-based immunoassay; detecting in a second biological sample (e.g., blood sample) obtained from a subject one or more RAN proteins using an electrochemiluminescence-based immunoassay, wherein the second biological sample is obtained after administration of a therapeutic agent to the subject; and determining that administration of the therapeutic agent to the subject results in a change (e.g., a reduction or inhibition) in one or more RAN protein levels in the subject if the amount of RAN proteins detected in the second biological sample is less than the amount of RAN proteins detected in the first biological sample.

In some aspects, the disclosure provides a kit comprising: one or more anti-RAN protein antibodies; and an electrochemiluminescence-based immunoassay plate and/or reagents.

In some embodiments, one or more anti-RAN protein antibodies are selected from anti-poly(GP) antibody, anti-poly(GR) antibody, anti-poly(PR) antibody, and anti-poly (PA) antibody. In some embodiments, the anti-RAN protein antibodies are monoclonal antibodies or polyclonal antibodies.

In some embodiments, an electrochemiluminescence-based immunoassay plate and/or reagents is a MSD assay plate and/or MSD assay reagents.

BRIEF DESCRIPTION OF DRAWINGS

FIG. 1A shows a standard curve for detection of poly(GP) RAN protein. FIG. 1B shows a standard curve for detection of poly(GR) RAN protein. FIG. 1C shows a standard curve for detection of poly(PR) RAN protein. FIG. 1D shows a standard curve for detection of poly(PA) RAN protein.

FIG. 2A shows data from an MSD assay measuring poly(GP) RAN protein level from a brain tissue soluble fraction obtained from a C9Orf72 mouse model (e.g., C9-BAC mouse model) of ALS/FTD. FCX=frontal cortex; CE=cerebellum; error bars represent standard deviation (SD); n=7 for C9(+), 3 for WT. FIG. 2B shows poly(GP) RAN protein level in soluble fractions obtained from transfected and control HEK293T cells. Error bars represent SD; n=3 for each group.

FIG. 3A shows a schematic depiction of AAV-EGFP and AAV-PKR(K296R) expression constructs. FIG. 3B shows data indicating a pharmacokinetic decrease in poly(GP) RAN protein in mice treated with a drug that targets the protein kinase R (PKR) pathway and blocks RAN translation.

FIG. 6A shows data indicating an increase in background signal detected by MSD over incubation time in blood held at room temperature (RT) or 4° C. for 1, 2, or 3 days relative to blood processed within 24 hours of collection. FIG. 6B shows data indicating an increase in background signal detected by MSD over incubation time (e.g., 1, 2, or 3 days) at room temperature (RT) relative to blood processed within 24 hours of collection. Higher background was observed in both C9(+) and C9(−) control samples; C9(+) and C9(−) samples were unable to be differentiated in samples held at RT. FIG. 6C shows data indicating an increase in background signal detected by MSD over incubation time (e.g., 1, 2, or 3 days) at 4° C. relative to blood processed within 24 hours of collection. Higher background was observed in both C9(+) and C9(−) control samples; C9(+) samples were able to be differentiated from C9(−) control samples for up to two days incubation at 4° C. In all MSD assays described in this figure, anti-GP antibody was used for detection of RAN protein.

DETAILED DESCRIPTION

Figure 1A:
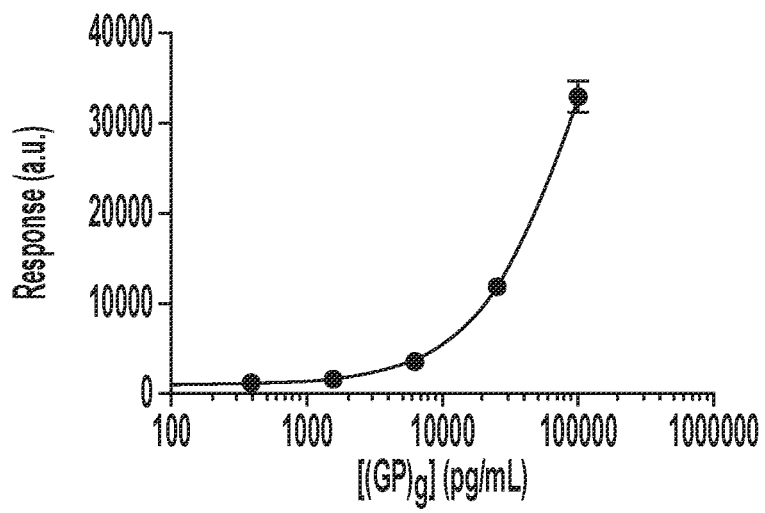
FIGS. 1A-1D show standard curves for detection of RAN proteins using a meso scale detection (MSD) assay.
Figure 1B:
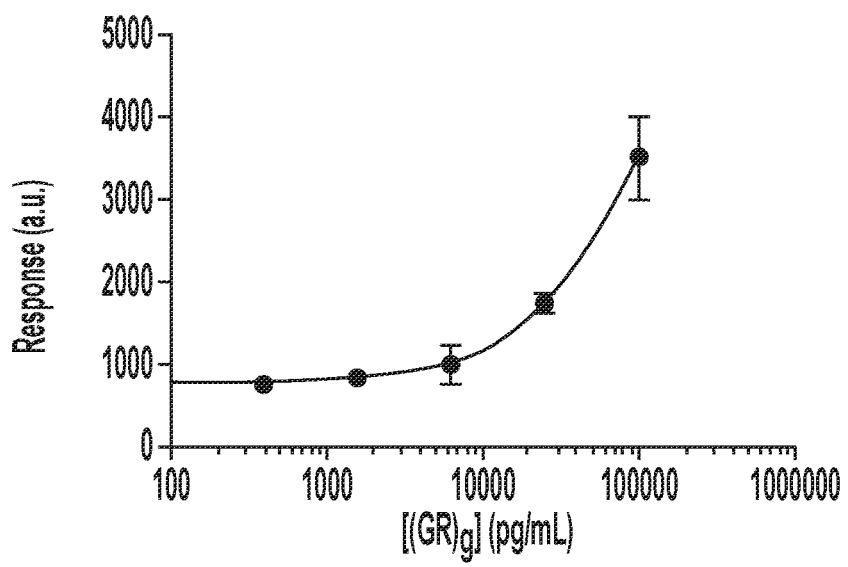
Figure 1C:
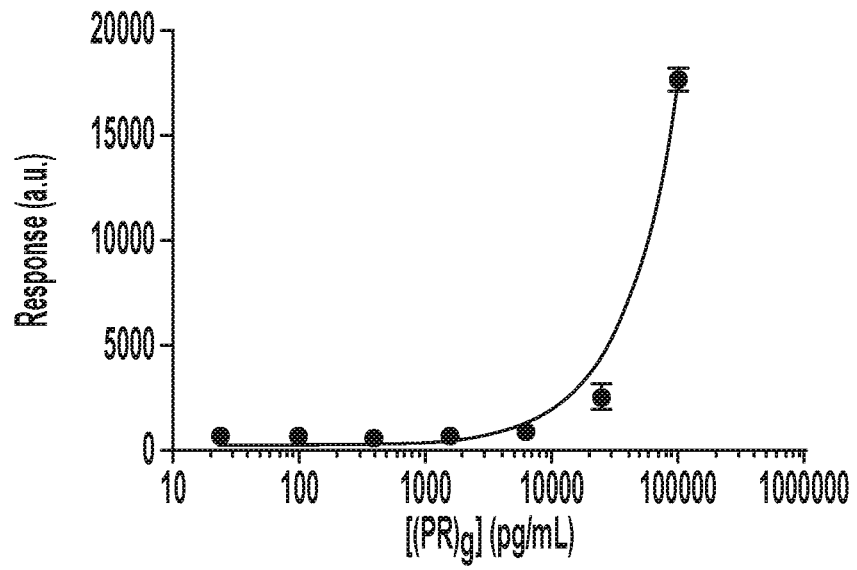
Figure 1D:
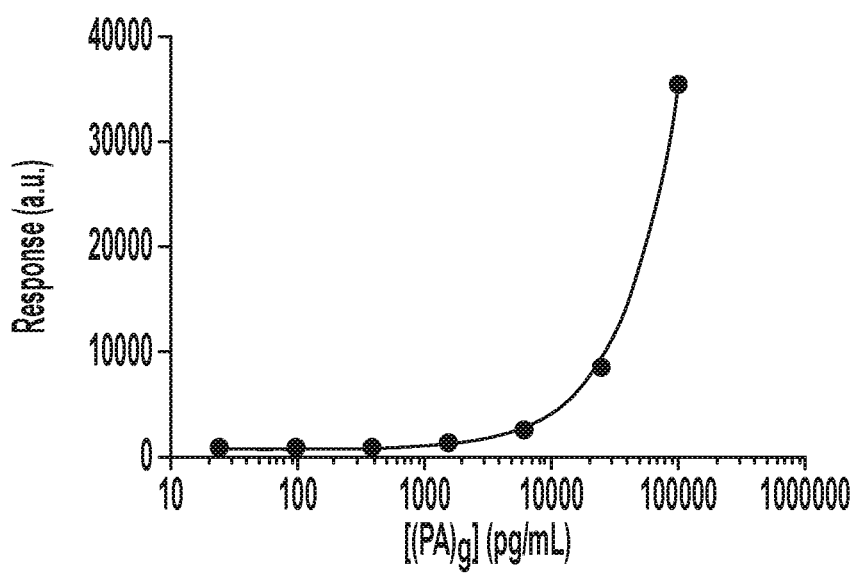

Aspects of the disclosure relate to methods and compositions useful for detecting repeat-associated non-ATG proteins (e.g., RAN proteins) in a biological sample obtained from a subject. The disclosure is based, in part, on longitudinal detection (e.g., detection over a defined time course) of one or more RAN protein levels in a biological sample using electrochemiluminescence-based immunoassays. In some embodiments, methods described by the disclosure are useful for indicating the effectiveness of therapeutic agents which inhibit RAN protein expression and/or RAN protein translation, for example by indicating a reduction in RAN protein levels after administration of one or more therapeutic agents to a subject.

Biological Samples

In some aspects, the disclosure relates to methods of detecting one or more RAN proteins (e.g., detecting the level of one or more RAN proteins) in a biological sample obtained from a subject.

A "subject having or suspected of having ALS and/or FTD" can be a subject that is known or determined to have more than 30 GGGGCC repeats in the C9ORF72 gene, or a subject exhibiting signs and symptoms of ALS/FTD, including but not limited to motor dysfunction (e.g., spasticity), muscle atrophy, and/or neuropsychiatric manifestations (e.g., compulsive behavior, apathy, anxiety).

A "subject having or suspected of having SCA36" can be a subject that is known or determined to have more than 30 TGGGCC repeats in the SCA36 gene, or a subject exhibiting signs and symptoms of SCA36, including but not limited to ataxia, muscle atrophy, hyperreflexia, dysarthria, fasciculations, and/or eye abnormalities (e.g., nystagmus, saccades, oculomotor apraxia, ptosis, etc.).

A "subject having or suspected of having Huntington's disease" can be a subject that is known or determined to have more than 35 CAG repeats in the HTT gene, or a subject exhibiting signs and symptoms of HD, including but not limited to motor dysfunction (e.g., chorea), diminished executive functions (e.g., cognitive flexibility and abstract thinking), and/or neuropsychiatric manifestations (e.g., compulsive behavior, apathy, anxiety). Generally, the disease status of a subject having or suspected of having HD is classified by the number of CAG repeats present (e.g., detected) in a HTT gene of the subject. Typically, a HTT gene having less than 36 trinucleotide (CAG) repeats produces non-pathogenic cytoplasmic Huntingtin protein. A subject having between 36 and 39 trinucleotide repeats produces mutant Huntingtin protein that is shorter than fully pathogenic forms, and may or may not develop disease. A subject having more than 40 trinucleotide repeats is classified as having fully penetrant HD and will eventually develop HD, also referred to as adult-onset HD. In certain cases of fully penetrant HD characterized by large (>100) repeats, subject can develop juvenile-onset HD, also referred to as akinetic-rigid, or Westphal variant HD. In some embodiments, a subject has or is suspected of having adult-onset HD. In some embodiments, a subject has or is suspected of having juvenile-onset HD.

A "RAN protein (repeat-associated non-ATG translated protein)" is a polypeptide translated from mRNA sequence carrying a nucleotidic expansion in the absence of an AUG initiation codon. Generally, RAN proteins comprise expansion repeats of one or amino acid, termed poly amino acid repeats (e.g., di-amino acid repeats). For example, in the context of ALS/FTD, which results from a repeat expansion of the hexanucleotide sequence GGGGCC in the C9ORF72 gene, the following di-amino acid repeat-containing RAN proteins have been identified: poly-(Gly-Ala), poly-(Gly-Pro), poly-(Gly-Arg), poly-(Pro-Ala), or poly-(Pro-Arg), also referred to as poly(GA), poly(GP), poly(GR), poly(PA), and poly(PR), respectively. ALS/RAN proteins are generally described, for example in International PCT Application PCT/US2014/022670, filed on Mar. 10, 2014, published as WO2014/159247, and U.S. application Ser. No. 14/775,278, filed on Sep. 11, 2015, published as US2016/0025747, the entire contents of each application which are incorporated by reference herein. In the context of SCA36, which results from a repeat expansion of the hexanucleotide sequence TGGGCC in the SCA36 gene, the following di-amino acid repeat-containing RAN proteins have been identified: poly (GP) and poly(PR). In the context of Huntington's disease (HD), RAN protein translation is caused by a CAG•CTG expansion in the Htt gene, which results in translation of RAN proteins polyAlanine, polySerine, polyLeucine, and polyCysteine (polyAla, polySer, polyLeu and polyCys), in addition to poly-Glutamine (polyGln or polyQ).

In some embodiments, the RAN protein is encoded by a gene associated with Huntington's disease (HD, HDL2), Fragile X Syndrome (FRAXA), Spinal Bulbar Muscular Atrophy (SBMA), Dentatorubropallidoluysian Atrophy (DRPLA), Spinocerebellar Ataxia 1 (SCA1), Spinocerebellar Ataxia 2 (SCA2), Spinocerebellar Ataxia 3 (SCA3), Spinocerebellar Ataxia 6 (SCA6), Spinocerebellar Ataxia 7 (SCAT), Spinocerebellar Ataxia 8 (SCAB), Spinocerebellar Ataxia 12 (SCA12), or Spinocerebellar Ataxia 17 (SCA17), amyotrophic lateral sclerosis (ALS), Spinocerebellar ataxia type 36 (SCA36), Spinocerebellar ataxia type 29 (SCA29), Spinocerebellar ataxia type 10 (SCA10), myotonic dystrophy type 1 (DM1), myotonic dystrophy type 2 (DM2), or Fuch's Corneal Dystrophy (e.g., CTG181).

A subject can be a mammal (e.g., human, mouse, rat, dog, cat, or pig). In some embodiments, the subject is a human. In some embodiments, a subject is a mammalian subject. In some embodiments, a subject is a human or a mouse. In some embodiments, a subject is characterized by a GGGGCC (e.g., $G_4C_2$) hexanucleotide sequence repeat expansion in the C9ORF72 gene (e.g., a human C9ORF72 gene or a gene, such as a mouse gene, corresponding to human C9ORF72 gene). In some embodiments, a human C9ORF72 gene comprises or consists of the sequence set forth in any one of NCBI Reference Sequence Numbers NM_145005.6, NM_018325.4, and NM_001256054.2. In some embodiments, a human SCA36 gene comprises or consists of the sequence set forth in any one of NCBI Reference Sequence Numbers NM_006392.3, NR_027700.2, and NR_145428.1. In some embodiments, a subject has been determined to have a hexanucleotide sequence repeat expansion (e.g., a GGGGCC (e.g., $G_4C_2$) repeat expansion in C9ORF72 or a TGGGCC repeat expansion in SCA36) by a genetic assay (e.g., a DNA-based assay, for example a sequencing assay).

In some embodiments, a subject comprises at least 50, at least 100, at least 200, at least 500, at least 1000, or at least 5000 GGGGCC repeat expansions (e.g., repeat expansions of C9ORF72). In some embodiments, a subject is characterized by a TGGGCC hexanucleotide sequence repeat expansion in the SCA36 gene (e.g., a human SCA36 gene or a gene, such as a mouse gene, corresponding to human SCA36 gene). In some embodiments, a subject comprises at least 50, at least 100, at least 200, at least 500, at least 1000, or at least 5000 TGGGCC repeat expansions (e.g., repeat expansions of SCA36).

Methods of the disclosure are useful in some embodiments, for investigating the efficacy of a therapeutic agent (e.g., a therapeutic agent candidate) in an animal model of a disease or disorder associated with RAN protein translation. A "therapeutic agent candidate" generally refers to an agent (e.g., small molecule, interfering RNA, protein, peptide, etc.) that is being tested for the ability to reduce or inhibit RAN protein translation in a cell or subject. Thus, in some embodiments, a subject is a C9-BAC mouse. The C9-BAC mouse model of ALS is described, for example in International PCT Application PCT/US2014/022670, filed on Mar. 10, 2014, published as WO2014/159247, and Liu et al. (2016) *Neuron* 90(3):521-34, the entire contents of each of which are incorporated herein by reference.

Generally, a biological sample can be blood, serum (e.g., plasma from which the clotting proteins have been removed), or cerebrospinal fluid (CSF). However, the skilled artisan will recognize other suitable biological samples, such as tissue (e.g., brain tissue, spinal tissue, etc.) and cells (e.g., brain cells, neuronal cells, skin cells, etc.). In some embodiments, a biological sample is a blood sample or a tissue sample. In some embodiments, a blood sample is a sample of whole blood, a plasma sample, or a serum sample. In some embodiments, a tissue sample is a CNS tissue sample. In some embodiments, a blood sample is treated to remove white blood cells (e.g., leukocytes), such as the buffy coat of the sample.

The disclosure is based, in part, on the surprising discovery that certain immunoassays (e.g., electrochemiluminescence-based immunoassays) can be used to detect one or more RAN proteins in a blood sample obtained from a subject. As described further in the Example, it was observed that blood sample processing time and conditions (e.g., incubation time and incubation temperature) affect the amount of background signal observed in a given blood sample. It was observed that if a blood sample is incubated (e.g., held or stored) at room temperature for more than 24 hours after being obtained from the subject, the levels of RAN proteins in the sample are indistinguishable from control samples due to high background signal. Similarly, it was observed that if a sample is stored at 4° C. for more than two days after being obtained from the subject, the levels of RAN proteins in the sample are indistinguishable from control samples due to high background signal.

In some embodiments, an immunoassay (e.g., an electrochemiluminescence-based immunoassay) is performed on a biological sample (e.g., a blood sample) within two days of being obtained from a subject. In some embodiments, an immunoassay (e.g., an electrochemiluminescence-based immunoassay) is performed on a biological sample (e.g., a blood sample) between about 1 minute and about 48 hours after being obtained from a subject. In some embodiments, an immunoassay (e.g., an electrochemiluminescence-based immunoassay) is performed on a biological sample (e.g., a blood sample) between about 60 minutes and about 24 hours after being obtained from a subject.

In some embodiments, a biological sample obtained from a subject is stored at a temperature between −80° C. and about 23° C. (e.g., room temperature). In some embodiments, a biological sample obtained from a subject is stored at a temperature between 0° C. and about 23° C. (e.g., about 0, 1, 2, 3, 4, 5, 6, 7, 8, 9, 10, 11, 12, 13, 14, 15, 16, 17, 18, 19, 20, 21, 22, or 23° C.). In some embodiments, a biological sample obtained from a subject is stored at a temperature between 20° C. and about 25° C. (e.g., about 20, 21, 22, 23, 24, or 25° C.).

A biological sample (e.g., a blood sample) may be manipulated or processed prior to being subjected to an immunoassay (e.g., an electrochemiluminescence-based immunoassay). For example, in some embodiments, a biological sample is subjected to an antigen retrieval process prior to being used in an immunoassay. As used herein, "antigen retrieval" (also referred to as epitope retrieval, or antigen unmasking) refers to a process in which a biological sample (e.g., blood, serum, CSF, etc.) are treated under conditions which expose antigens (e.g., epitopes) that were previously inaccessible to detection agents (e.g., antibodies, aptamers, and other binding molecules) prior to the process. Generally, antigen retrieval methods comprise steps including but not limited to heating, pressure treatment, enzymatic digestion, treatment with reducing agents, treatment with oxidizing agents, treatment with crosslinking agents, treatment with denaturing agents (e.g., detergents, ethanol, acids), or changes in pH, or any combination of the foregoing. Several antigen retrieval methods are known in the art, including but not limited to protease-induced epitope retrieval (PIER) and heat-induced epitope retrieval (HIER). In some embodiments, antigen retrieval procedures reduce the background and increase the sensitivity of detection techniques (e.g., electrochemiluminescence-based immunoassays, immunohistochemistry (IHC), immuno-blot (such as Western Blot), ELISA, etc.).

RAN Protein Detection Assays

In some aspects, the disclosure provides a kit comprising one or more anti-RAN protein antibodies, and an electrochemiluminescence-based immunoassay. Generally, an "electrochemiluminescence-based immunoassay" refers to an biological assay in which binding of capture antibodies (e.g., one or more anti-RAN protein antibodies) to analytes (e.g., one or more RAN proteins) in a biological sample are detected using electrochemiluminescent labels (e.g., detectable moieties which emit light when stimulated by electricity in the appropriate chemical environment (e.g., in the presence of tripropylamine, TPrA). Electrochemiluminescent labels are described, for example by Muzyka (2014) *Biosens Bioelectron* 15(54):393-407.

In some embodiments, an electrochemiluminescence-based immunoassay is a Meso Scale Detection (MSD) assay. As used herein the term "meso scale detection (MSD) assay" refers to an immunoassay used for detection of analytes by electrochemiluminescence (e.g., using one or more detectable reagents, such as SULFO-TAG™ labels (e.g., labels comprising one or more Ruthenium complexes) that emit light upon electrochemical stimulation), for example as described by Moxness et al. (2005) *Clin. Chem.* 51(10): 1983-5, and U.S. Pat. No. 7,008,796, which is incorporated by reference with respect to description of MSD assay steps.

Generally, a MSD assay comprises contacting a solid substrate, for example a multi-well assay plate comprising one or more capture antibodies (e.g., one or more anti-RAN protein antibodies) attached to the substrate, with a biological sample (e.g., a blood sample obtained from a subject), under conditions under which RAN proteins present in the biological sample bind to the one or more capture antibodies to form a complex, and subsequently contacting the complexes with one or more secondary antibodies (e.g., an antibody that binds to the RAN protein portion of the complex or an antibody that binds to the capture antibody, such as an anti-mouse antibody, anti-rabbit antibody, etc.) that are conjugated to a detectable reagent. In some embodiments, a detectable reagent comprises an electrochemiluminescent moiety, for example as described in U.S. Pat. No. 5,310,687, which is incorporated herein by reference with respect to disclosure regarding such electrochemiluminescent moieties. In some embodiments, a detectable reagent comprises a Ruthenium complex, for example Ruthenium (II) tris-bipyridine-(4-methylsulfone), also referred to as $[Ru(Bpy)_3]^{+2}$, or a salt thereof.

A detectable reagent (e.g., a detectable moiety, for example a Ruthenium complex, such as a SULFO-TAG™) may be conjugated to a primary antibody (e.g., a capture antibody, such as an anti-RAN protein antibody) or a secondary antibody (e.g., a detection antibody, such as an antibody that binds to a RAN protein or an antibody that binds to a capture antibody).

In some aspects, the disclosure provides a method for measuring one or more RAN proteins in a sample (e.g., using a kit as described herein), the method comprising: detecting in a biological sample (e.g., a blood sample, CNS tissue sample, etc.) obtained from a subject one or more RAN proteins using an electrochemiluminescence-based immunoassay. In some embodiments a subject is diagnosed as having or being at risk of developing ALS and/or FTD based upon detection of the one or more RAN proteins in the biological sample. In some embodiments a subject is diagnosed as having or being at risk of developing SCA36 based upon detection of the one or more RAN proteins in the biological sample. In some embodiments, a subject has previously been determined (e.g., diagnosed by a medical professional such as a doctor) as having ALS, FTD, or SCA36 based upon a genetic test (e.g., a nucleic acid-based test, such as a PCR-based test, identifying the presence of a repeat expansion of C9ORF72 or SCA36 of the subject).

In some embodiments, one or more RAN proteins detected in a sample is selected from poly(GP), poly(GR), poly(PR), and poly(PA). In some embodiments, two, three or four RAN proteins are detected in a sample (e.g., poly(GP, poly(GR), poly(PR), and poly(PA), or any combination thereof).

In some embodiments, an electrochemiluminescence-based immunoassay comprises a step of contacting the sample with one or more anti-RAN protein antibodies. In some embodiments, an anti-RAN antibody is selected from an anti-poly(GP) antibody, anti-poly(GR) antibody, anti-poly(PR) antibody, and anti-poly(PA) antibody. In some embodiments, an anti-RAN antibody targets poly-Alanine, poly-Leucine, poly-Serine, or poly-Cysteine, for example as described in PCT Publication No. WO 2017/176813.

In some embodiments, an anti-RAN antibody binds to a di-amino acid repeat region of a RAN protein or binds to a C-terminal portion of a RAN protein. In some embodiments, an anti-RAN antibody targets a homopolymeric amino acid repeat region or a C-terminus of a RAN protein translated from a Htt gene.

In some embodiments, an anti-RAN antibody may target any portion of a RAN protein that does not comprise the poly amino acid repeat. Examples of anti-RAN antibodies targeting the C-terminus of RAN protein are disclosed, for example, in U.S. Publication No. 2013/0115603, the entire content of which is incorporated herein by reference. In some embodiments a set (or combination) of anti-RAN antibodies (e.g., a combination of two or more anti-RAN antibodies selected from anti-poly(GP), anti-poly(PR), anti-poly(PA), and anti-poly(GR)) is used to detect one or more RAN proteins in a biological sample.

An anti-RAN antibody can be a polyclonal antibody or a monoclonal antibody. Typically, polyclonal antibodies are produced by inoculation of a suitable mammal, such as a mouse, rabbit or goat. Larger mammals are often preferred as the amount of serum that can be collected is greater. An antigen is injected into the mammal. This induces the B-lymphocytes to produce IgG immunoglobulins specific for the antigen. This polyclonal IgG is purified from the mammal's serum. Monoclonal antibodies are generally produced by a single cell line (e.g., a hybridoma cell line). In some embodiments, an anti-RAN antibody is purified (e.g., isolated from serum).

Numerous methods may be used for obtaining anti-RAN antibodies. For example, antibodies can be produced using recombinant DNA methods. Monoclonal antibodies may also be produced by generation of hybridomas (see e.g., Kohler and Milstein (1975) Nature, 256: 495-499) in accordance with known methods. Hybridomas formed in this manner are then screened using standard methods, such as enzyme-linked immunosorbent assay (ELISA) and surface plasmon resonance (e.g., OCTET or BIACORE) analysis, to identify one or more hybridomas that produce an antibody that specifically binds with a specified antigen. Any form of the specified antigen (e.g., a RAN protein) may be used as the immunogen, e.g., recombinant antigen, naturally occurring forms, any variants or fragments thereof. One exemplary method of making antibodies includes screening protein expression libraries that express antibodies or fragments thereof (e.g., scFv), e.g., phage or ribosome display libraries. Phage display is described, for example, in Ladner et al., U.S. Pat. No. 5,223,409; Smith (1985) Science 228:1315-1317; Clackson et al. (1991) Nature, 352: 624-628; Marks et al. (1991) J. Mol. Biol., 222: 581-597WO92/18619; WO 91/17271; WO 92/20791; WO 92/15679; WO 93/01288; WO 92/01047; WO 92/09690; and WO 90/02809.

In addition to the use of display libraries, the specified antigen (e.g., one or more RAN proteins) can be used to immunize a non-human animal, e.g., a rodent, e.g., a mouse, hamster, or rat. In one embodiment, the non-human animal is a mouse.

In another embodiment, a monoclonal antibody is obtained from the non-human animal, and then modified, e.g., made chimeric, using recombinant DNA techniques known in the art. A variety of approaches for making chimeric antibodies have been described. See e.g., Morrison et al., Proc. Natl. Acad. Sci. U.S.A. 81:6851, 1985; Takeda et al., Nature 314:452, 1985, Cabilly et al., U.S. Pat. No. 4,816,567; Boss et al., U.S. Pat. No. 4,816,397; Tanaguchi et al., European Patent Publication EP171496; European Patent Publication 0173494, United Kingdom Patent GB 2177096B.

Antibodies can also be humanized by methods known in the art. For example, monoclonal antibodies with a desired binding specificity can be commercially humanized (Scotgene, Scotland; and Oxford Molecular, Palo Alto, Calif.). Fully humanized antibodies, such as those expressed in transgenic animals are within the scope of the invention (see, e.g., Green et al. (1994) Nature Genetics 7, 13; and U.S. Pat. Nos. 5,545,806 and 5,569,825).

For additional antibody production techniques, see Antibodies: A Laboratory Manual, Second Edition. Edited by Edward A. Greenfield, Dana-Farber Cancer Institute, ©2014. The present disclosure is not necessarily limited to any particular source, method of production, or other special characteristics of an antibody.

In some embodiments, an anti-RAN antibody is purified (e.g., isolated from serum). In some embodiments, an anti-RAN antibody is labeled (e.g., comprises a fluorescent label, luminescent label, radiolabel, enzymatic label, or any other detectable label, etc.).

In some embodiments, an anti-RAN antibody has a Kd value (equilibrium dissociation constant between the antibody and the RAN antigen) ranging from the low micromolar ($10^{-6}$) to nanomolar ($10^{-7}$ to $10^{-9}$). In some embodiments, an anti-RAN antibody has a Kd value in the low nanomolar range ($10^{-9}$). In some embodiments, an anti-RAN antibody has a Kd value in the picomolar range ($10^{-12}$).

Accordingly, in some embodiments, methods and kits described by the disclosure are capable of measuring levels of RAN proteins in a subject over a specified time period (e.g. longitudinally over a course of treatment), thereby providing an assessment of therapeutic efficacy of certain ALS/FTD or SCA36 treatments (e.g., therapeutic agents for treating ALS/FTD or SCA36). Without wishing to be bound by any theory, measuring a reduced level of one or more RAN proteins in a subject after administration of a therapeutic agent for treatment of ALS/FTD or SCA36 (e.g., relative to the level of RAN proteins measured in the subject prior to the administration) is indicative of the therapeutic agent effectively treating the subject for ALS/FTD or SCA36.

In some aspects, the disclosure provides a method for measuring pharmacokinetic changes in RAN protein expression, the method comprising detecting in a first biological sample (e.g., blood sample) obtained from a subject one or more RAN proteins using an electrochemiluminescence-based immunoassay; detecting in a second biological sample (e.g., blood sample) obtained from a subject one or more RAN proteins using an electrochemiluminescence-based immunoassay, wherein the second biological sample is obtained after administration of a therapeutic agent to the subject; and determining that administration of the therapeutic agent to the subject results in a change (e.g., an elevation or decrease) in one or more RAN protein levels in the subject if the amount of RAN proteins detected in the second biological sample is less than the amount of RAN proteins detected in the first biological sample.

As used herein, "elevated" means that the level of one or more di-amino acid-repeat-containing proteins or a hexanucleotide repeat-containing RNA is above a control level, such as a pre-determined threshold or a level of one or more di-amino acid-repeat-containing proteins or a hexanucleotide repeat-containing RNA in a control sample. Controls and control levels include RAN protein levels obtained (e.g., detected) from a subject that does not have or is not suspected of having ALS/FTD, or SCA36 (e.g., a subject having 30 or less repeats of a GGGGCC expansion or a TGGGCC expansion). An elevated level includes a level that is, for example, 1%, 5%, 10%, 20%, 30%, 40%, 50%, 60%, 70%, 80%, 90%, 100%, 150%, 200%, 300%, 400%, 500%, or more above a control level. An elevated level also includes increasing a phenomenon from a zero state (e.g., no or undetectable di-amino acid-repeat-containing protein expression or hexanucleotide repeat-containing RNA expression) to a non-zero state (e.g., some or detectable di-amino acid-repeat-containing protein expression or hexanucleotide repeat-containing RNA).

As used herein, "decreased" means that the level of one or more di-amino acid-repeat-containing proteins or a hexanucleotide repeat-containing RNA is below a control level, such as a pre-determined threshold or a level of one or more di-amino acid-repeat-containing proteins or a hexanucleotide repeat-containing RNA in a control sample. Controls and control levels include RAN protein levels obtained (e.g., detected) from a subject that does not have or is not suspected of having ALS/FTD, or SCA36 (e.g., a subject having 30 or less repeats of a GGGGCC expansion or a TGGGCC expansion). A decreased level includes a level that is, for example, 1%, 5%, 10%, 20%, 30%, 40%, 50%, 60%, 70%, 80%, 90%, 100%, 150%, 200%, 300%, 400%, 500%, or more below a control level. A decreased level also includes decreasing a phenomenon from a non-zero state (e.g., some or detectable di-amino acid-repeat-containing protein expression or hexanucleotide repeat-containing RNA) to a zero state (e.g., no or undetectable di-amino acid-repeat-containing protein expression or hexanucleotide repeat-containing RNA expression). In some embodiments, a decrease (e.g., decrease in the level of one or more RAN protein in the sample relative to a control or a prior sample) can be indicative of therapeutic efficacy of a therapeutic agent (e.g., therapeutic efficacy in the subject from which the sample was obtained).

The time between which a first biological sample and a second biological sample are obtained may vary. In some embodiments, a first biological sample is obtained between 1 week and 1 minute prior to administration of a therapeutic agent (e.g., the first administration of a therapeutic agent). In some embodiments, a first biological sample is obtained between 1 day (e.g., 24 hours) and 1 minute prior to administration of a therapeutic agent (e.g., the first administration of a therapeutic agent). In some embodiments, a second biological sample is obtained from the subject between 1 minute and six months after administration of a therapeutic agent (e.g., the first administration of a therapeutic agent). In some embodiments, a second biological sample is obtained from the subject between 1 day and 1 week after administration of a therapeutic agent (e.g., the first administration of a therapeutic agent). In some embodiments, a second biological sample is obtained from the subject between 1 day and 1 week after administration of a therapeutic agent (e.g., the most recent or last administration of a therapeutic agent).

In some embodiments, a second biological sample may be collected about 1 hour, 5 hours, 10 hours, 24 hours (e.g., 1 day), 48 hours (e.g., 2 days), 120 hours (e.g., 5 days), 30 days, 45 days, or six months after administration of the therapeutic agent. In some embodiments, several biological samples (e.g., 2, 3, 4, 5, 6, 7, 8, 9, 10, or more biological samples) are obtained from the subject, for example over a specified timeframe (e.g., during a therapeutic course) and one or more RAN proteins are detected.

Methods of Treating Diseases and Disorders Associated with RAN Protein Translation The disclosure relates, in some aspects, to methods of monitoring a therapeutic treatment course for a disease associated with RAN protein translation, for example ALS/FTD, SCA36, HD, etc. In some aspects, the disclosure provides methods of treating a disease associated with RAN protein translation comprising administering an effective amount of a therapeutic agent to a subject who has been determined to exhibit increased RAN protein translation (e.g., relative to a subject not having a disease or disorder associated with RAN protein translation) as measured by an electrochemiluminescent immunoassay. In some embodiments, the subject has previously been administered a therapeutic agent (e.g., prior to the determining). In some embodiments, the therapeutic agent administered to the subject is different from the previously administered therapeutic agent. In some embodiments, a subject is administered an increased or decreased dose of a therapeutic agent based on detection of an elevated or reduced level of RAN proteins in a biological sample as measured by an electrochemiluminescent immunoassay.

In some embodiments, methods described by the disclosure comprise a step of administering a therapeutic agent (e.g., an agent for treatment of ALS/FTD or an agent for treatment of SCA36) to the subject if the level of RAN proteins detected in the biological sample is elevated compared to a level of RAN proteins detected in a control sample.

Controls and control levels include RAN protein levels obtained (e.g., detected) from a subject that does not have or is not suspected of having a disease or disorder associated with RAN protein translation, for example ALS/FTD, or SCA36 (e.g., a subject having 30 or less repeats of a GGGGCC expansion or a TGGGCC expansion). In some embodiments, a control sample refers to a sample obtained from a subject having or suspected of having a disease associated with RAN protein translation prior to the administration of a therapeutic agent to the subject.

As used herein, "treat" or "treatment" refers to (a) preventing or delaying the onset of a disease or disorder associated with RAN protein translation; (b) reducing the severity of a disease or disorder associated with RAN protein translation; (c) reducing or preventing development of symptoms characteristic of a disease or disorder associated with RAN protein translation; (d) preventing worsening of symptoms characteristic of a disease or disorder associated with RAN protein translation; and/or (e) reducing or preventing recurrence of symptoms in subjects that were previously symptomatic for a disease or disorder associated with RAN protein translation.

For example, in the context of ALS/FTD, "treat" or "treatment" refers to (a) preventing or delaying the onset of ALS and/or FTD, or SCA36; (b) reducing the severity of ALS and/or FTD, or SCA36; (c) reducing or preventing development of symptoms characteristic of ALS and/or FTD, or SCA36; (d) preventing worsening of symptoms characteristic of ALS and/or FTD, or SCA36; and/or (e) reducing or preventing recurrence of ALS and/or FTD, or SCA36 symptoms in subjects that were previously symptomatic for ALS and/or FTD, or SCA36. Examples of therapeutic agents for the treatment of ALS/FTD include but are not limited to Riluzole (Rilutek, Sanofi-Aventis), trazodone (Desyrel, Oleptro), selective serotonin reuptake inhibitors (SSRIs), baclofen, diazepam, phenytoin, trihexyphenidyl, amitriptyline, anti-RAN antibodies, etc.

In another example, "treating HD" refers to (a) preventing or delaying the onset of HD; (b) reducing the severity of HD; (c) reducing or preventing development of symptoms characteristic of HD; (d) preventing worsening of symptoms characteristic of HD; and/or (e) reducing or preventing recurrence of HD symptoms in subjects that were previously symptomatic for HD. Examples of therapeutic agents for the treatment of tetrabenazine, haloperidol, chlorpromazine, risperidone, quetiapine, amantadine, levetiracetam, clonazepam, citalopram, fluoxetine, sertraline, olanzapine, alproate, carbamazepine, lamotrigine, cysteamine, PBT2, PDE10A inhibitor, pridopidine, laquinimod, anti-RAN antibodies, etc.

A subject may be administered a therapeutically effective amount of one or more therapeutic agents. As used herein, an "effective amount" is a dosage of a therapeutic agent sufficient to provide a medically desirable result, such as treatment or amelioration of one or more signs or symptoms caused by a disease or disorder associated with RAN protein translation or accumulation (e.g., a neurodegenerative disease). The effective amount will vary with the age and physical condition of the subject being treated, the severity of the disease or disorder (e.g., the amount of RAN protein accumulation, or cellular toxicity caused by such an accumulation) in the subject, the duration of the treatment, the nature of any concurrent therapy, the specific route of administration and the like factors within the knowledge and expertise of the health practitioner.

Generally, a therapeutic agent can be a small molecule (e.g., metformin or a metformin derivative), an interfering RNA (e.g., dsRNA, siRNA, miRNA, amiRNA, ASO, aptamer, etc.), protein or fragment thereof, peptide, antibody, etc. In some embodiments, a therapeutic agent modulates RAN protein expression, for example by modulating a pathway that controls RAN protein expression, such as protein kinase R (PKR) pathway, EIF2 pathway or EIF3 pathway. In some embodiments, a therapeutic agent is delivered by a viral vector, for example a lentiviral vector, retroviral vector, adenoviral vector, or adeno-associated virus (AAV) vector.

The identification and selection of appropriate additional therapeutic agents is within the capabilities of a person of ordinary skill in the art, and will depend upon the disease from which the subject is suffering. For example, in some embodiments one or more therapeutic agents for Huntington's disease (e.g. tetrabenazine, amantadine, chlorpromazine, etc.), Fragile X Syndrome (e.g., selective serotonin reuptake inhibitors, carbamazepine, methylphenidate, Trazodone, etc.), Spinocerebellar Ataxia (e.g., baclofen, riluzole, amantadine, varenicline, etc.), or amyotrophic lateral sclerosis (ALS) (e.g., riluzole, etc.), myotonic dystrophy type 1 (tideglusib, mexiletine, etc.) are administered to the subject.

Administration of a treatment may be accomplished by any method known in the art (see, e.g., Harrison's Principle of Internal Medicine, McGraw Hill Inc.). Administration may be local or systemic. Administration may be parenteral (e.g., intravenous, subcutaneous, or intradermal) or oral. Compositions for different routes of administration are well known in the art (see, e.g., Remington's Pharmaceutical Sciences by E. W. Martin). Dosage will depend on the subject and the route of administration. Dosage can be determined by the skilled artisan.

Without wishing to be bound by any particular theory, detection (e.g., quantification of RAN proteins) in the biological samples can be used to determine the effectiveness of a therapeutic agent or regime in the subject from which the samples are obtained.

Kits

In some aspects, the disclosure provides a kit comprising a first container containing one or more anti-RAN antibodies and a second container containing one or more detectable reagents. In some embodiments, the one or more anti-RAN antibodies bind to one or more RAN proteins selected from poly(GP), poly(GR), poly(PR), and poly(PA). In some embodiments, the one or more anti-RAN antibodies bind to one or more RAN proteins selected from targets poly-Alanine, poly-Leucine, poly-Serine, or poly-Cysteine. In some embodiments, the one or more detectable reagents comprise a Ruthenium complex, for example Ruthenium (II) tris-bipyridine-(4-methylsulfone), also referred to as [Ru (Bpy)$_3$]$^{+2}$, or a salt thereof. In some embodiments, a kit comprises a third container containing a control sample. A control sample may be a negative control sample (e.g., a control sample that does not contain or lacks, one or more RAN proteins) or a positive control sample (e.g., a control sample that comprises one or more RAN proteins, optionally wherein the amount of the one or more RAN proteins in the sample is known).

EXAMPLE

Use of a meso scale detection (MSD) assay for detection of RAN protein translation from the C9ORF72 gene was investigated. FIGS. 1A-1D show standard curves for detection of RAN proteins (poly(GP) in FIG. 1A, poly(GR) in FIG. 1B, poly(PR) in FIG. 1C, and poly(PA) in FIG. 1D) using a meso scale detection (MSD) assay. Each of the anti-RAN protein antibodies tested in this example was a polyclonal antibody that binds to the di-amino acid repeat region of the respective RAN protein.

Figure 2A:
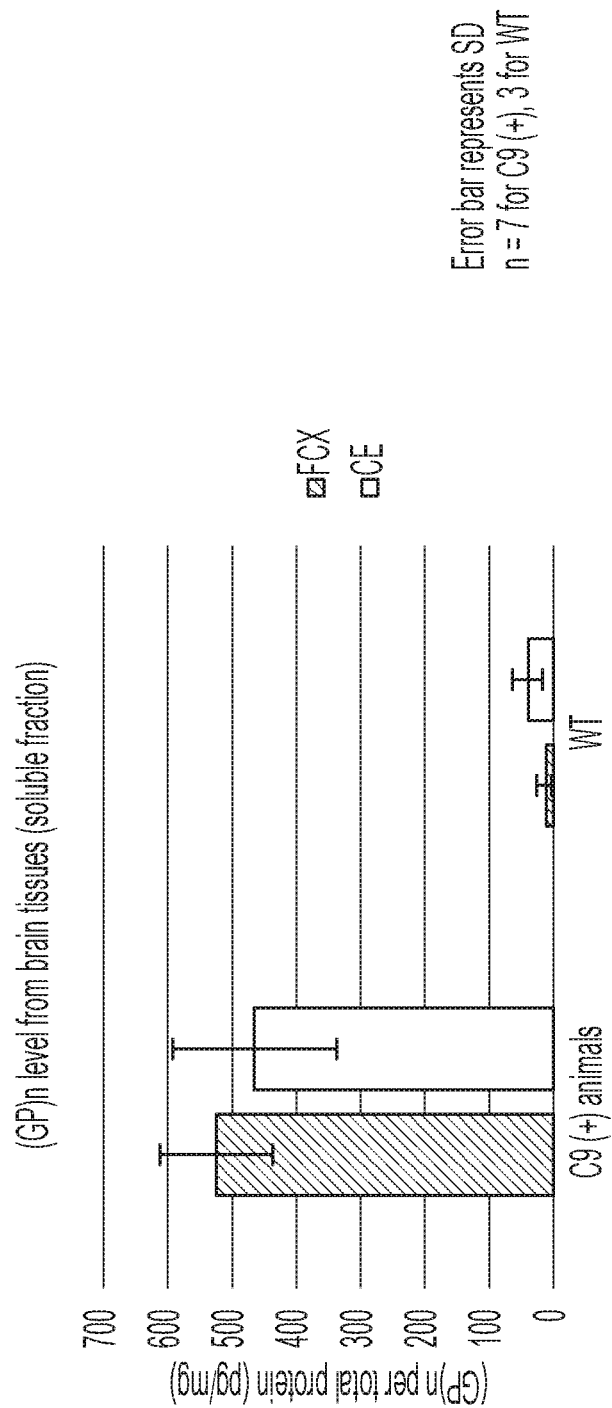
FIGS. 2A-2B show poly(GP) quantitative analysis using MSD.
Figure 2B:
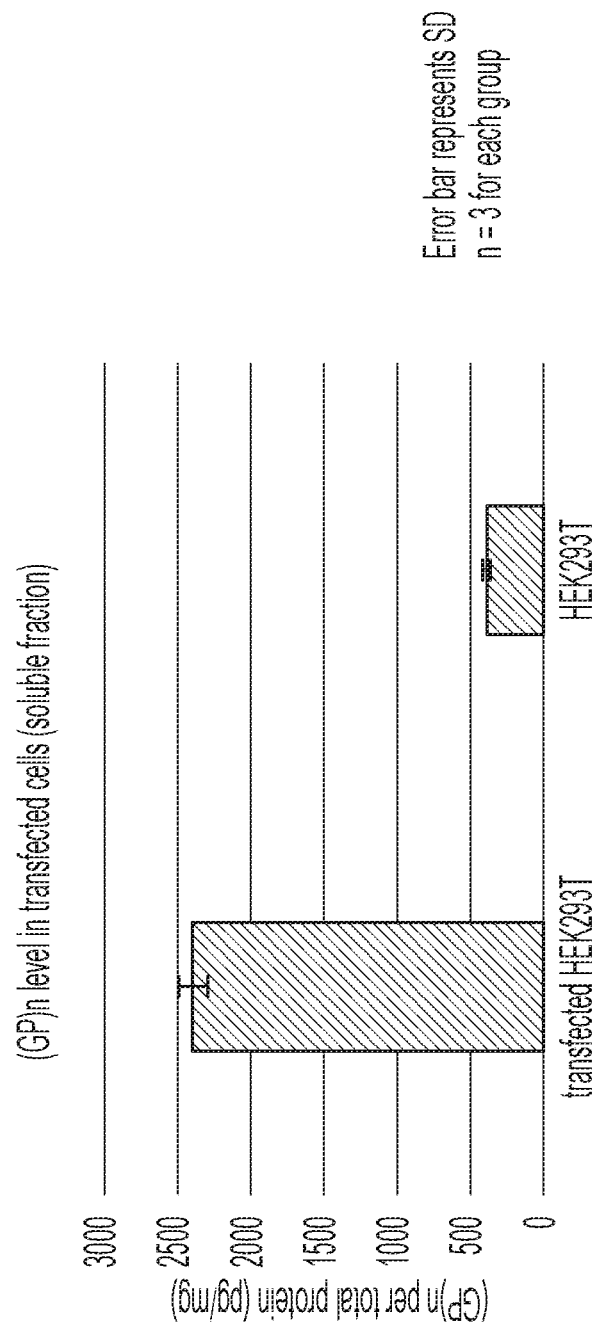

The MSD assay was tested for detection of poly(GP) RAN protein in vitro and on biological samples obtained from mammalian subjects. FIG. 2A shows data from an MSD assay measuring poly(GP) RAN protein level from a brain tissue soluble fraction obtained from a C9Orf72 mouse model (e.g., C9-BAC mouse model, "C9(+)") of ALS/FTD. Data indicate detection of increased poly(GP) protein in both frontal cortex (FCX) and cerebellum (CE) of C9(+) relative to wild-type (WT) mice by MSD. Increased expression of poly(GP) protein was also detected by MSD in HEK293 cells that had been transfected with a poly(GP) expression construct relative to untransfected HEK293 cells (FIG. 2B).

Figure 3A:
FIGS. 3A-3B show MSD assay detects pharmacokinetic decrease in poly(GP) RAN proteins in C9-BAC mice.
Figure 3A:
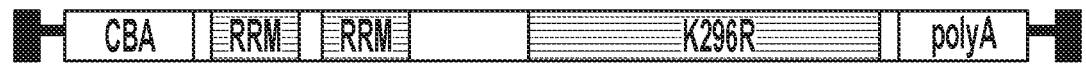
Figure 3B:
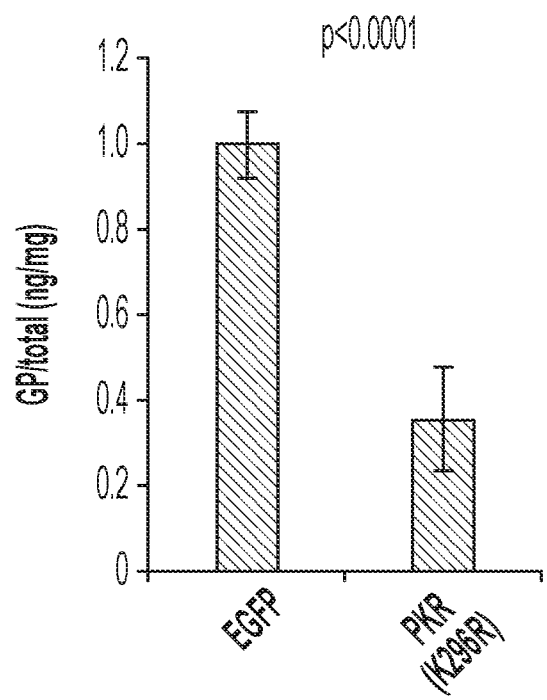

RAN translation in a mouse model of ALS/FTD (e.g., C9-BAC mice) after administration of a therapeutic agent was also investigated by MSD assay. Briefly, C9(+) or C9(−) control mice were administered an rAAV configured to express EGFP (control) or therapeutic agent protein kinase R (PKR) variant K296R, which is a dominant negative variant of PKR observed to inhibit RAN translation. FIG. 3A shows a schematic depiction of AAV-EGFP and AAV-PKR(K296R) expression constructs. MSD data indicate a pharmacokinetic decrease in poly(GP) RAN protein in C9(+) mice treated with a PKR K296R compared to control mice administered the EGFP construct.

Figure 4:
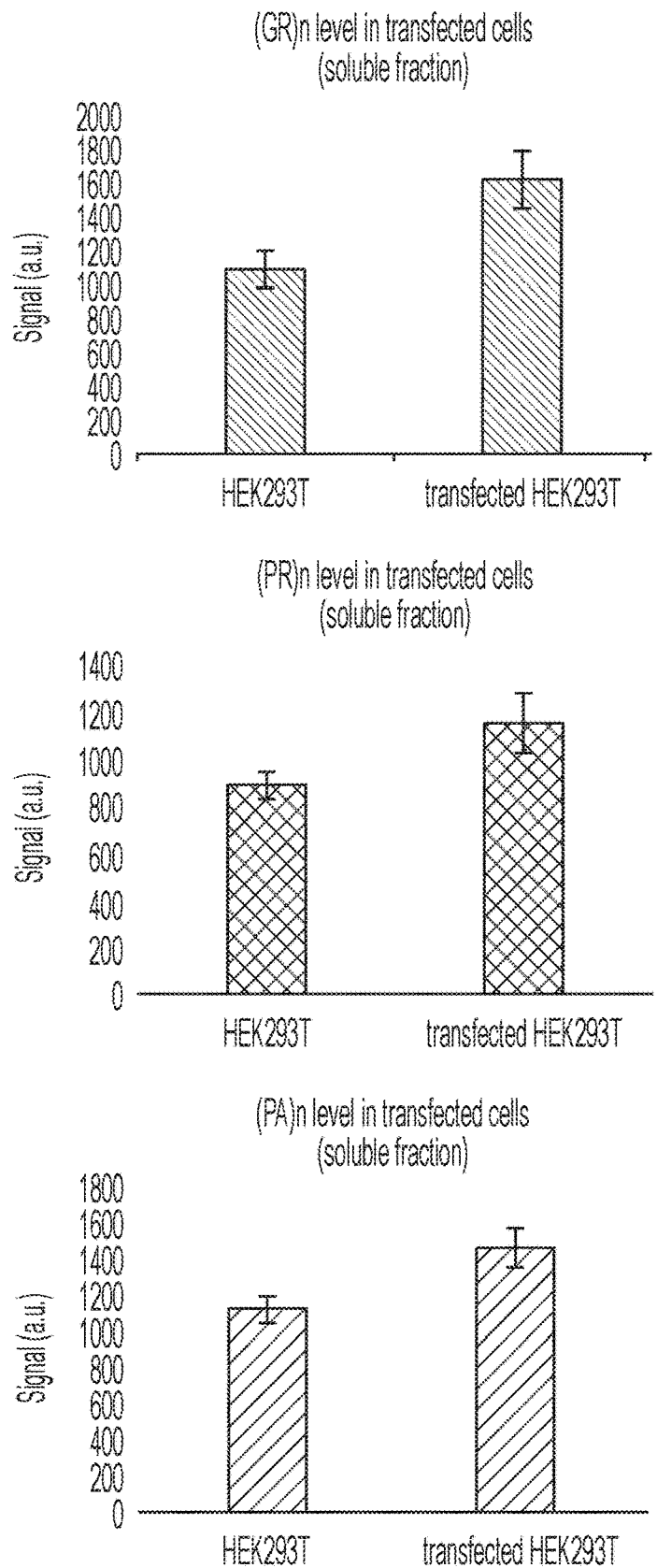
FIG. 4 shows MSD assay detection of C9 RAN protein levels in soluble fractions obtained from transfected or control cells. GR=poly(GR) RAN protein, PR=poly(PR) RAN protein; PA=poly(PA) RAN protein. Error bars represent SD from three technical replicates.

Antibodies targeting additional RAN proteins were also tested in the MSD assay system. HEK 293 cells were transfected with expression constructs encoding poly(GR), poly(PR), and poly(PA) RAN proteins. MSD assay was performed and RAN protein expression levels of transfected cells were compared to untransfected control cells. FIG. 4 shows MSD assay detection of C9 RAN protein levels (poly(GR), poly(PR), poly(PA); left to right) in soluble fractions obtained from transfected or control cells. Increased RAN protein level was detected by MSD assay in each transfected cell sample relative to control cells.

Figure 5:
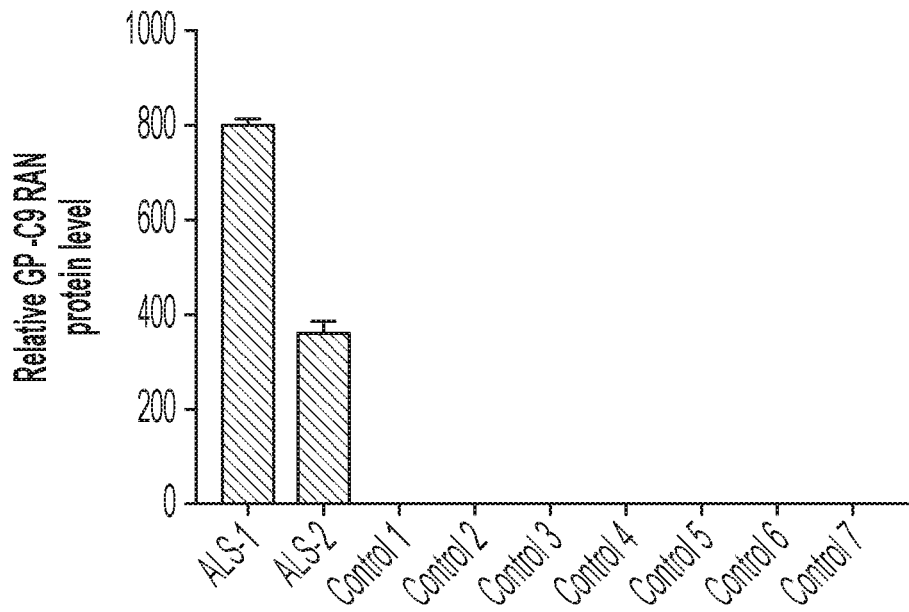
FIG. 5 shows a Meso Scale Detection (MSD) assay of poly(GP) RAN proteins in blood samples from C9ORF72 ALS patients. Relative levels of poly(GP) RAN protein were quantified by MSD assay using a polyclonal anti-poly(GP) antibody. Significantly higher levels of poly(GP) protein were observed in two study subjects that are positive for the C9ORF72 repeat expansion compared to seven independent control subjects.

The ability of MSD assay to detect levels of RAN proteins in biological samples obtained from human subjects was investigated. FIG. 5 shows a Meso Scale Detection (MSD) assay of poly(GP) RAN proteins in blood samples obtained from C9ORF72 ALS patients. Relative levels of poly(GP) RAN protein were quantified by MSD assay using a polyclonal anti-poly(GP) antibody. Significantly higher levels of poly(GP) protein were observed in two study subjects that are positive for the C9ORF72 repeat expansion compared to seven independent control subjects (e.g., subjects not having the C9ORF72 repeat expansion).

Figure 6A:
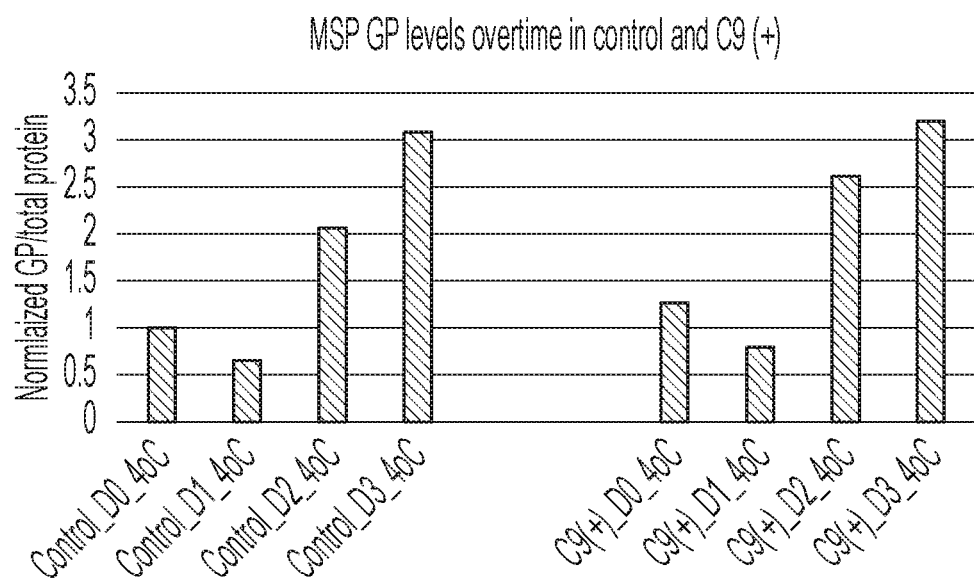
FIGS. 6A-6C show representative data for Meso Scale Detection (MSD) assays performed on blood samples at different processing times and temperatures.
Figure 6B:
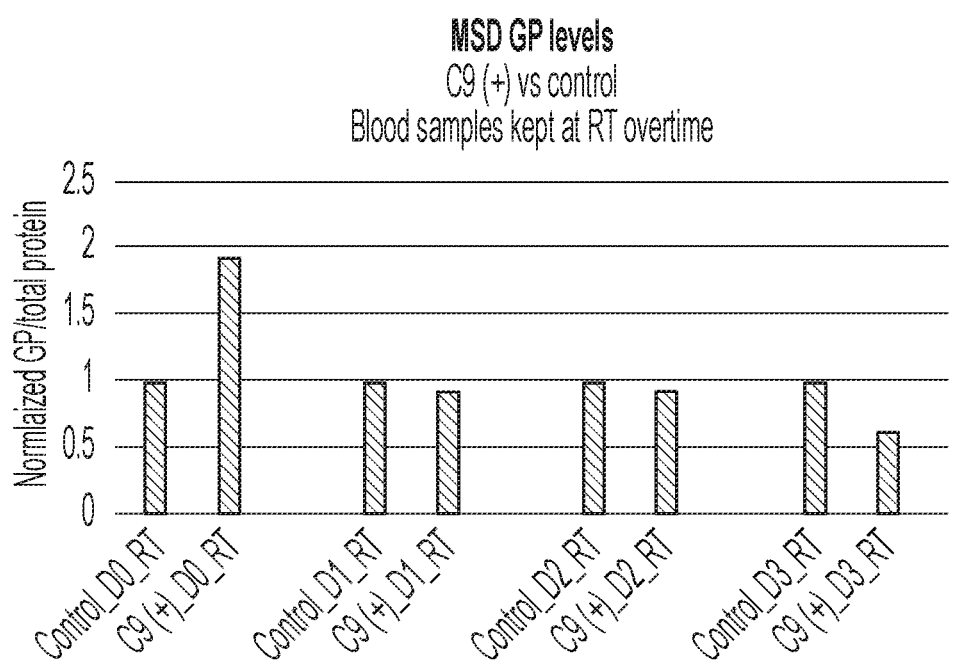
Figure 6C:
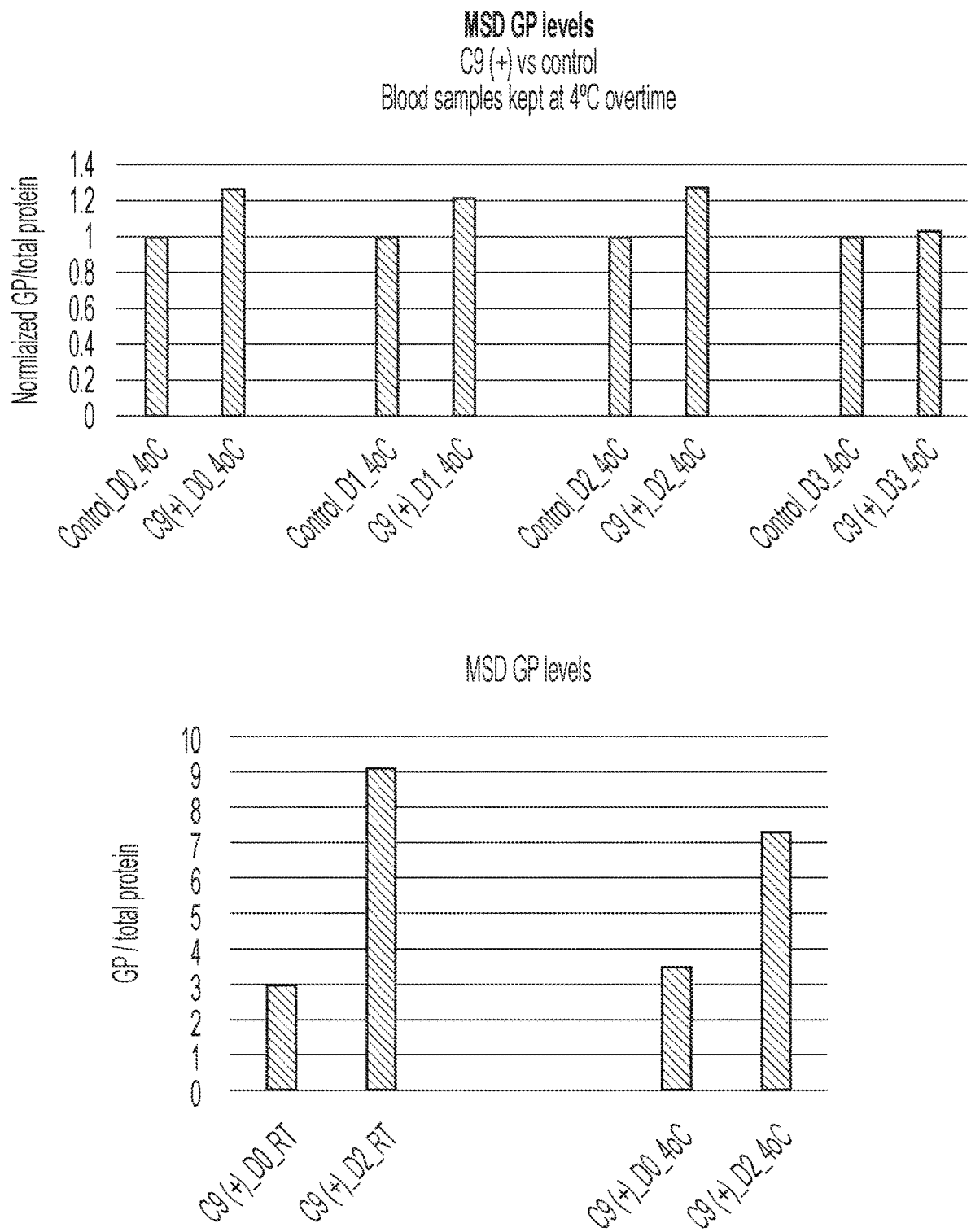

Processing conditions for biological samples obtained from subjects were investigated. FIGS. 6A-6C show representative data for Meso Scale Detection (MSD) assays performed on blood samples obtained from subjects at different processing times and temperatures. Anti-poly(GP) antibody was used in this study. Generally, data indicate an increase in background signal detected by MSD over incubation time in blood held at room temperature (RT) or 4° C. for 1, 2, or 3 days relative to blood processed within 24 hours of collection (FIG. 6A). An increase in background signal detected by MSD over incubation time (e.g., 1, 2, or 3 days) was observed at room temperature (RT) relative to blood processed within 24 hours of collection. Higher background was observed in both C9(+) and C9(−) control samples. Indeed, C9(+) and C9(−) samples were unable to be differentiated in samples held at RT for 1, 2, or 3 days. A similar but less significant trend was observed at 4° C. (FIG. 6C). However, at 4° C., although higher background was observed in both C9(+) and C9(−) control samples, C9(+) samples were able to be differentiated from C9(−) control samples for up to two days incubation.

What is claimed is:

1. A method comprising, in the following order:
   (i) performing an electrochemiluminescence immunoassay on a blood sample obtained from a mammalian subject having or suspected of having amyotrophic lateral sclerosis (ALS), wherein the electrochemiluminescence immunoassay is a meso scale detection (MSD) assay that comprises a step of contacting the blood sample with an anti-RAN protein antibody that binds to poly [Gly-Pro] RAN proteins and a detectable reagent that labels the anti-RAN protein antibody, wherein the detectable reagent comprises a Ruthenium complex;
   (ii) detecting an electrochemiluminescence level of the Ruthenium complex in the detectable reagent labeling the anti-RAN protein antibody bound to poly [Gly-Pro] RAN proteins in the blood sample, wherein the electrochemiluminescence level detected is greater than a control electrochemiluminescence level, and
   (iii) administering to the subject an agent for treatment of ALS after detecting the electrochemiluminescence level that is greater than the control electrochemiluminescence level, wherein the agent is selected from riluzole, trazodone, baclofen, diazepam, phenytoin, trihexyphenidyl, amitriptyline, and an anti-RAN protein antibody,
   wherein the electrochemiluminescence immunoassay is performed within 24 hours of the blood sample being obtained from the mammalian subject and wherein the blood sample is stored at a temperature below 25° C. prior to performing the MSD assay.

2. The method of claim 1, wherein the mammalian subject is a human or a mouse.

3. The method of claim 1, wherein the mammalian subject comprises a GGGGCC hexanucleotide sequence repeat expansion in the C9ORF72 gene.

4. A method comprising, in the following order:
   (i) performing an electrochemiluminescence immunoassay on a first blood sample obtained from a mammalian subject having or suspected of having amyotrophic lateral sclerosis (ALS), wherein the electrochemiluminescence immunoassay is a meso scale detection (MSD) assay that comprises a step of contacting the blood sample with an anti-RAN protein antibody that binds to poly [Gly-Pro] RAN proteins and a detectable reagent that labels the anti-RAN protein antibody, wherein the detectable reagent comprises a Ruthenium complex, and wherein the first blood sample is obtained before administration of an agent for treatment of ALS selected from riluzole, trazodone, baclofen, diazepam, phenytoin, trihexyphenidyl, amitriptyline, and an anti-RAN protein antibody to the mammalian subject, and wherein the electrochemiluminescence assay is performed within 24 hours of the first blood sample being obtained;
   (ii) performing an electrochemiluminescence immunoassay on a second blood sample obtained from the mammalian subject, wherein the electrochemiluminescence immunoassay is an MSD assay that comprises a step of contacting the second blood sample with an anti-RAN protein antibody that binds to poly [Gly-Pro] RAN proteins and a detectable reagent that labels the anti-RAN protein antibody, wherein the detectable reagent comprises a Ruthenium complex, and wherein the second blood sample is obtained after administration of the agent for treatment of ALS to the mammalian subject, and wherein the electrochemiluminescence assay is performed within 24 hours of the second blood sample being obtained;
   (iii) detecting electrochemiluminescence levels of the Ruthenium complex in the detectable reagent labeling the anti-RAN protein antibody bound to poly [Gly-Pro] RAN proteins in the first and second blood samples, wherein the electrochemiluminescence levels detected are greater than a level of electrochemiluminescence of a control sample;
   (iv) determining the electrochemiluminescence level detected in the second blood sample is lower than the electrochemiluminescence level detected in the first blood sample, and
   (v) continuing to administer the agent for treatment of ALS to the mammalian subject after determining the electrochemiluminescence level detected in the second blood sample is lower than the electrochemiluminescence level detected in the first blood sample.

5. The method of claim 4, wherein the mammalian subject is a human or a mouse.

* * * * *